US009733668B2

United States Patent
Park et al.

(10) Patent No.: US 9,733,668 B2
(45) Date of Patent: Aug. 15, 2017

(54) WEARABLE SMART DEVICE

(71) Applicant: LG ELECTRONICS INC., Seoul (KR)

(72) Inventors: Kyoungjoon Park, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/924,407

(22) Filed: Oct. 27, 2015

(65) Prior Publication Data

US 2016/0239046 A1    Aug. 18, 2016

Related U.S. Application Data

(60) Provisional application No. 62/116,887, filed on Feb. 16, 2015.

(30) Foreign Application Priority Data

Apr. 21, 2015    (KR) .................... 10-2015-0055867

(51) Int. Cl.
| | |
|---|---|
| G06F 1/16 | (2006.01) |
| H04M 1/02 | (2006.01) |
| G04G 17/04 | (2006.01) |
| G04G 17/08 | (2006.01) |
| H04B 1/3827 | (2015.01) |
| G04G 21/04 | (2013.01) |

(52) U.S. Cl.
CPC ............ *G06F 1/163* (2013.01); *G04G 17/04* (2013.01); *G04G 17/08* (2013.01); *G06F 1/1652* (2013.01); *G06F 1/1679* (2013.01); *H04B 1/385* (2013.01); *H04M 1/0268* (2013.01); *G04G 21/04* (2013.01)

(58) Field of Classification Search
CPC combination set(s) only.
See application file for complete search history.

(56) References Cited

U.S. PATENT DOCUMENTS

| 5,931,764 A  * | 8/1999  | Freeman .................. G04G 9/00 361/679.03 |
|---|---|---|
| 7,558,057 B1 * | 7/2009  | Naksen ................. G06F 1/1613 361/679.3 |
| 9,510,470 B2 * | 11/2016 | Huitema ............... G06F 1/1652 |
| 2006/0209218 A1 * | 9/2006  | Lee .......................... G04G 9/00 349/1 |
| 2014/0160055 A1 | 6/2014  | Margolis et al. |
| 2014/0307395 A1 | 10/2014 | An |
| 2014/0337621 A1 * | 11/2014 | Nakhimov .............. G06F 1/163 713/168 |
| 2016/0259430 A1 * | 9/2016  | Hong ..................... G09G 5/003 |

FOREIGN PATENT DOCUMENTS

| GB | 2 432 190 A | 5/2007 |
|---|---|---|
| WO | WO 2013/191859 A2 | 12/2013 |
| WO | WO 2015/100404 A1 | 7/2015 |

* cited by examiner

*Primary Examiner* — Lisa Lea Edmonds
(74) *Attorney, Agent, or Firm* — Birch, Stewart, Kolasch & Birch, LLP

(57) ABSTRACT

A wearable smart device including a flexible display unit; a first frame configured to support the flexible display unit and be recoverably deformed to have a first curvature to be worn on a body of a user; and a second frame configured to be recoverably deformed to have a second curvature greater than the first curvature and to be movably coupled with the first frame to relatively move with respect to the first frame while being deformed.

20 Claims, 13 Drawing Sheets

FIG. 8
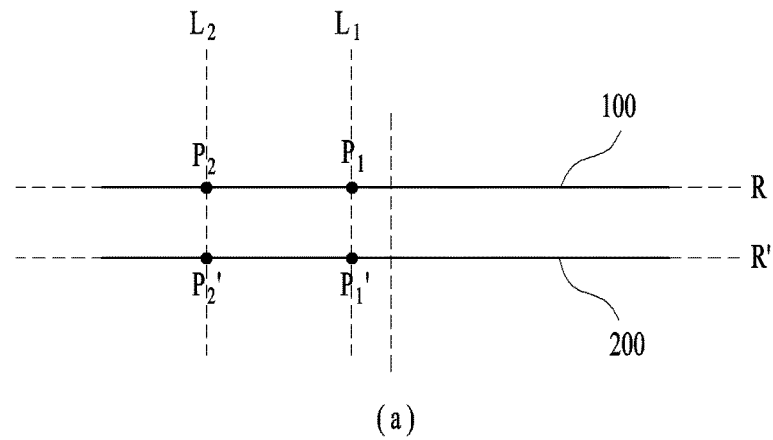
(a)
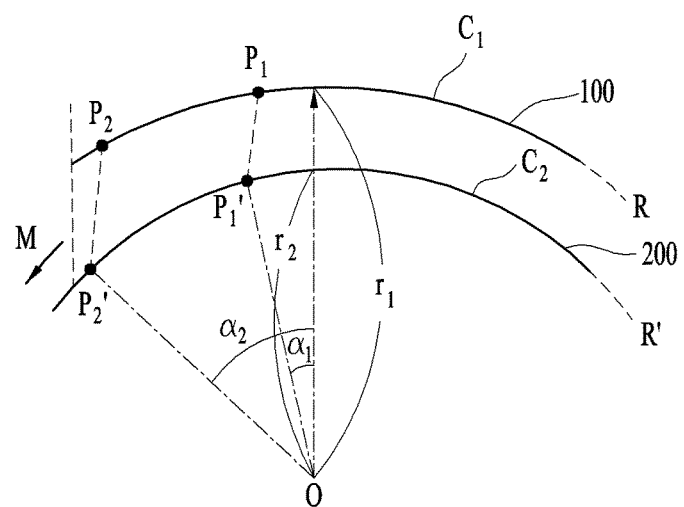
(b)
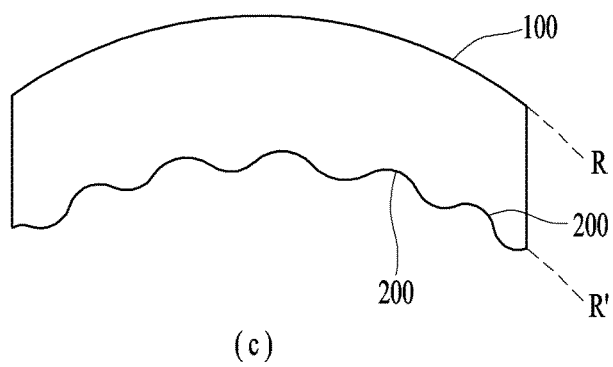
(c)

FIG. 15
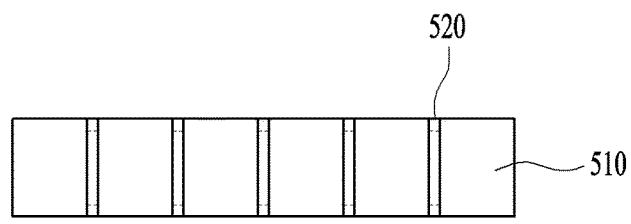
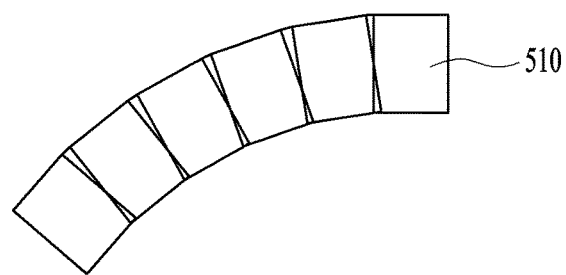
(a)
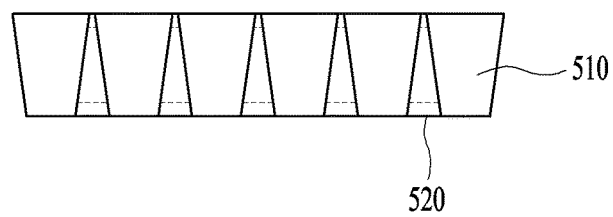
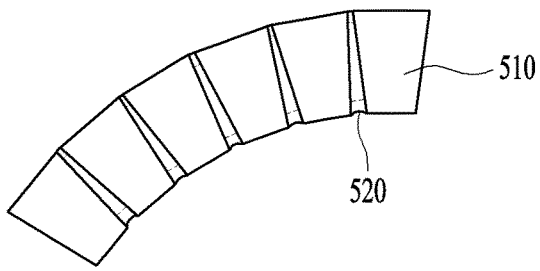
(b)

WEARABLE SMART DEVICE

CROSS REFERENCE TO RELATED APPLICATIONS

This non-provisional application claims the benefit under 35 U.S.C. §119(e) to U.S. Provisional Application No. 62/116,887, filed on Feb. 16, 2015, and under 35 U.S.C. §119(a) to Patent Application No. 10-2015-0055867, filed in the Republic of Korea on Apr. 21, 2015, all of which are hereby expressly incorporated by reference into the present application.

BACKGROUND OF THE INVENTION

Field of the Invention

The present invention relates to a smart device including a mobile terminal, and more particularly, to a smart device capable of being worn on a wrist of a user.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. In order to perform the aforementioned functions, basically, a mobile terminal is connected with different devices or a network using various communication protocols and can provide ubiquitous computing environment to a user. In particular, the mobile terminal is evolving to a smart device enabling connectivity to a network and ubiquitous computing.

Conventionally, the smart device as the mobile terminal has been manufactured by a size capable of being held by a hand of a user and the user used to carry the smart device by hand or put in a bag or a pocket. Yet, with technological advances, the smart device is manufactured by a smaller size and is evolving to a wearable device directly worn on a body of a user. A wearable smart device basically provides a lot more merits to a user in carrying the wearable smart device. Yet, for more convenient and comfortable wearing of the smart device, it is still required to have many improvements in the wearable device.

SUMMARY OF THE INVENTION

Accordingly, one object of the present invention is directed to an apparatus and method thereof that substantially obviate one or more problems due to limitations and disadvantages of the related art.

Another object of the present invention is to provide a wearable smart device capable of being conveniently and comfortably worn on a user.

To achieve these objects and other advantages and in accordance with the purpose of the invention, as embodied and broadly described herein, according to a first aspect, a wearable smart device includes a flexible display unit, a first frame configured to support the flexible display unit and the first frame configured to be recoverably deformed to have first curvature to be worn on a body of a user and a second frame configured to be recoverably deformed to have second curvature greater than the first curvature and the second frame configured to be movably coupled with the first frame to relatively move for the first frame while being transformed. The first frame can be configured by a body of a long plate shape. The first frame can include a plurality of notches arranged according to a length direction of the first frame and a plurality of the notches can be alternately arranged at both sides of the first frame.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 8 is a schematic diagram illustrating a relation between a transformed first and a second frame;

FIG. 15 is schematic diagram illustrating a part of a cover of a wearable smart device.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A smart device described in the present specification can include a cellular phone, a smartphone, a laptop computer, a digital broadcasting terminal, a PDA (personal digital assistants), a PMP (portable multimedia player), a navigation, a slate PC, a tablet PC, an ultra-book, a wearable device (e.g., a terminal of watch-type (a smartwatch), a terminal of glass-type (a smart glass), a HMD (head mounted display) and the like. However, the present specification can also be applied to a different general smart device except a case that the configuration is applicable to a wearable smart device only.

Figure 1:
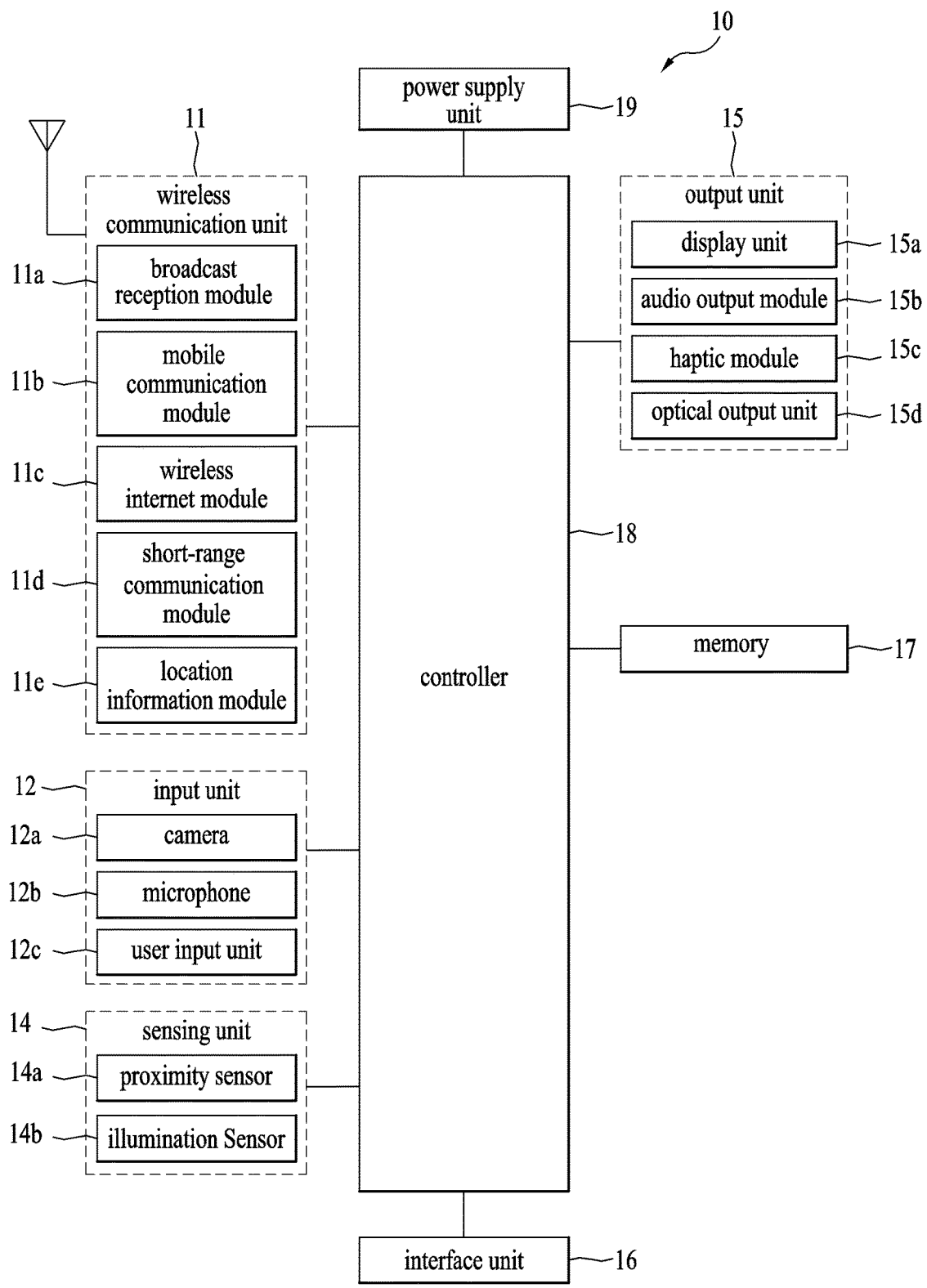
FIG. 1 is a block diagram illustrating a configuration of a wearable smart device related to the present invention.

FIG. 1 is a block diagram illustrating a configuration of a wearable smart device related to the present invention. The wearable smart device 10 can include a wireless communication unit 11, an input unit 12, a detection unit 14, an output unit 15, an interface unit 16, a memory 17, a controller 18, a power supply unit 19 and the like. The wearable smart device described in the present specification may have configuration elements more or less than the aforementioned configuration elements.

More specifically, among the configuration elements, the wireless communication unit 11 can include one or more modules enabling wireless communication to be performed between the wearable smart device 10 and a wireless communication system, between the wearable smart device 10 and a different smart device 10 or between the wearable smart device 10 and an external server. And, the wireless communication unit 11 can include one or more modules configured to connect the wearable smart device 10 with one or more networks.

The wireless communication unit 11 can include at least one of a broadcast reception module 11a, a mobile communication module 11b, a wireless internet module 11c, a short-range communication module 11d and a location information module 11e. The input unit 12 includes a camera 12a or an image input unit for obtaining an image signal, a microphone 12b or an audio input unit for inputting an audio signal, and a user input unit 12c (for example, a touch key, a push key (a mechanical key), and the like) for allowing a user to input information. Audio data or image data is obtained by the input unit 12 and can be analyzed and processed by a control command of a user.

The sensing unit 14 can include one or more sensors to sense at least one of information of the wearable smart device, environment information surrounding the wearable smart device and user information. For instance, the sensing unit 140 can include at least one of a proximity sensor 14a, an illumination sensor 14b, a touch sensor, an acceleration sensor, a magnetic sensor, a gravity sensor (G-sensor), a gyroscope sensor, a motion sensor, an RGB sensor, an infrared sensor (IR sensor), a finger recognition sensor (finger scan sensor), a ultrasonic sensor, an optical sensor (e.g., a camera (refer to 12a)), a microphone (refer to 12b), a battery gauge, an environment sensor (e.g., a barometer, a hygrometer, a thermometer, a radioactivity detection sensor, a heat detection sensor, a gas detection sensor etc.), and a chemical sensor (e.g., an electronic nose, a healthcare sensor, a biometric sensor etc.). Meanwhile, the wearable smart device disclosed in the present specification can be utilized by combining information sensed by two or more sensors among the aforementioned sensors with each other.

The output unit 15 is used to generate an output related to a sense of vision, a sense of hearing and a sense of tactile. The output unit can include at least one of a display unit 15a, an audio output unit 15b, a haptic module 15c and an optical output unit 15d. The display unit 15a can implement a touch screen by forming a layer structure with a touch sensor or forming an integrated body with the touch sensor. The touch screen functions as a user input unit 12c providing an input interface between the wearable smart device 10 and a user and may also be able to provide an output interface between the wearable smart device 10 and the user.

The interface unit 16 performs a role of a path to an external device of various types connected with the wearable smart device 10. The interface unit 16 can include at least one of a wired/wireless headset port, an external charger port, a wired/wireless data port, a memory card port, a port used for connecting a device on which an identification module is mounted, an audio I/O (input/output) port, a video I/O (input/output) port, and an earphone port. The wearable smart device 10 can perform an appropriate control related to an external device connected with the interface unit 16 when the external device is connected with the interface unit.

The memory 17 stores data supporting various functions of the wearable smart device 10. The memory 17 can store a plurality of application programs (or applications) drivable in the wearable smart device 10, data for an operation of the wearable smart device 10, and commands. At least a part of the application programs can be downloaded from an external server via radio communication. And, at least a part of the application programs may exist in the wearable smart device 10 from the timing of manufacturing the wearable smart device 10 for a basic function (e.g., making a call, receiving a call, receiving a message, sending a message) of the wearable smart device 10. Meanwhile, an application program is stored in the memory 17, is installed in the wearable smart device 10 and is driven to make an operation (or function) of the wearable smart device to be performed by the controller 18.

The controller 18 typically functions to control overall operation of the wearable smart device 10, in addition to the operations associated with the application programs. The controller 18 may provide or process information or functions appropriate for a user by processing signals, data, information and the like, which are input or output by the aforementioned various configuration elements or activating application programs stored in the memory 17.

The controller 18 controls at least a part of the configuration elements shown in FIG. 1 to drive an application program stored in the memory 17. Moreover, the controller 18 can make the wearable smart device 10 drive by combining at least two or more configuration elements included in the wearable smart device 10 with each other to drive the application program.

The power supply unit 19 can be configured to receive external power or provide internal power in order to supply appropriate power to each of the configuration elements included in the wearable smart device 10 under a control of the controller 18. The power supply unit 19 may include a battery 19a (refer to FIG. 4), and the battery 19a may be configured to be embedded in the wearable smart device, or configured to be detachable from the wearable smart device.

At least a part of the configuration elements can cooperate with each other to implement an operation, a control and a method of controlling the wearable smart device according to various embodiments described in the following. The operation, the control and the method of controlling the wearable smart device can be implemented in the wearable smart device 10 by driving at least one or more application programs stored in the memory 17.

The wearable smart device 10 is depicted as a device including a type, i.e., a watch-type or a bracelet-type capable of being worn on a body, i.e., a wrist of a user in the following drawings, by which the present invention may be non-limited. The present invention can also be applied to various structures including a clip type, a glass type, a folder type of which two or more bodies are movably combined with each other, a slide type, a swing type, a swivel type and the like. In particular, a configuration of a specific form of the wearable smart device 10 and explanation on the configuration can be generally applied to not only the specific form of the wearable smart device 10 but also a wearable smart device 10 of a different type.

A general configuration of the aforementioned wearable smart device 10 is explained and then an overall structure of the wearable smart device 10 is schematically explained with reference to a related drawing in the following. Regarding this, FIG. 2 is a perspective diagram illustrating a wearable smart device, FIG. 3 is a side view diagram illustrating a wearable smart device, FIG. 4 is a cross section diagram illustrating a wearable smart device obtained according to A-A line shown in FIG. 1, and FIG. 5 is a side view diagram illustrating a wearable smart device transformed to be worn on a wrist of a user.

Figure 2:
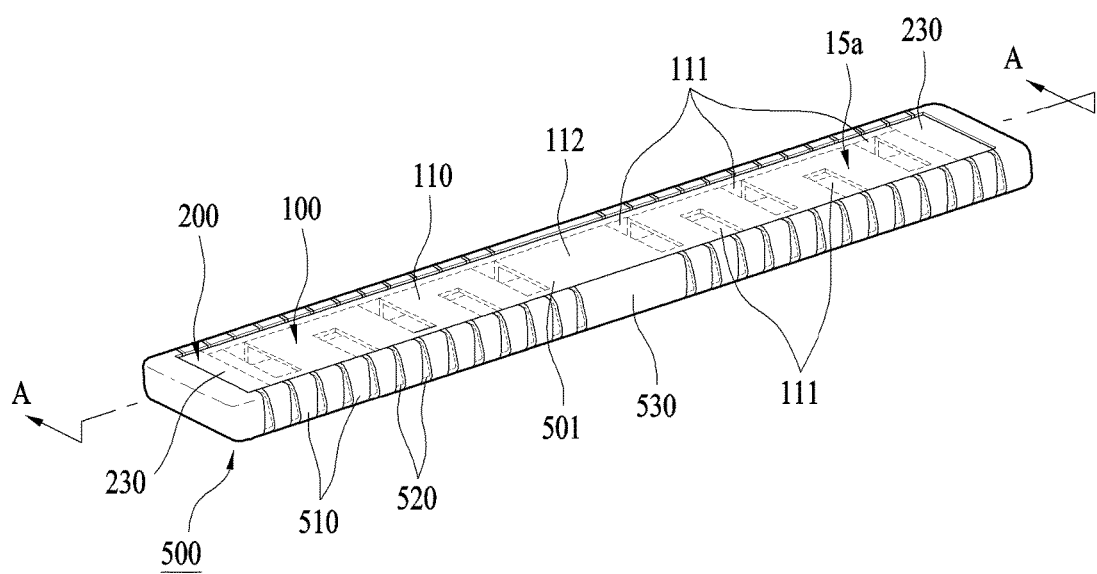
FIG. 2 is a perspective diagram illustrating a wearable smart device.
Figure 3:
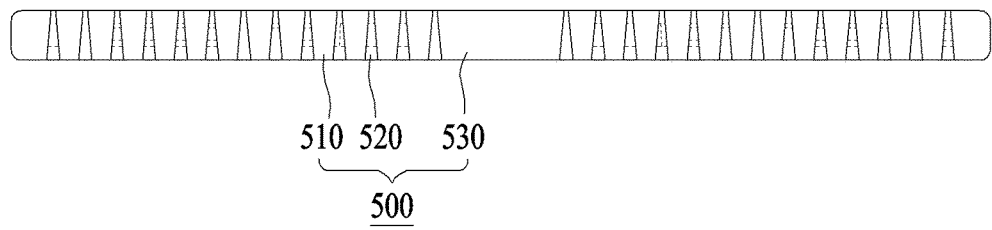
FIG. 3 is a side view diagram illustrating a wearable smart device.
Figure 4:
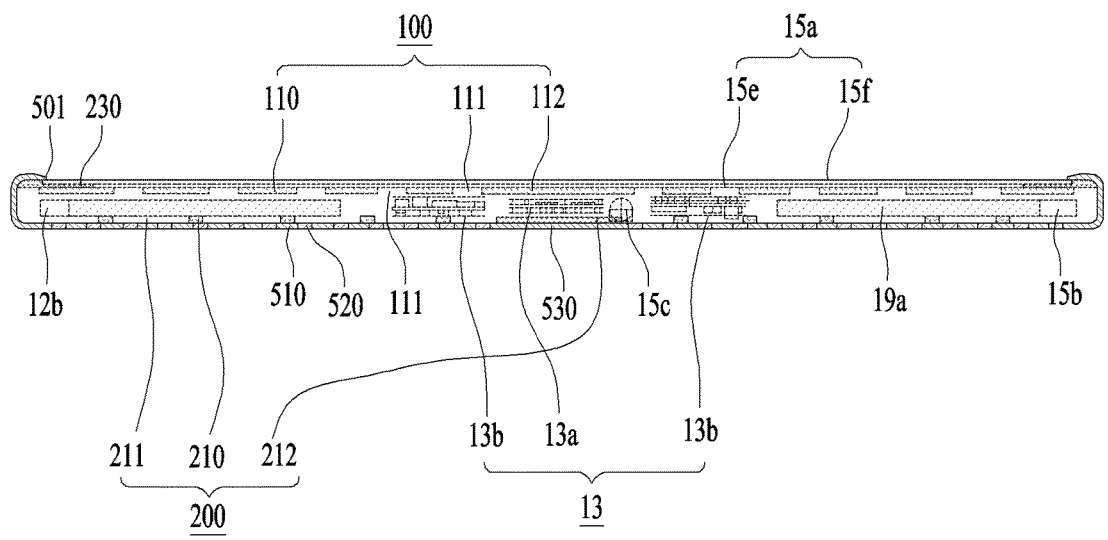
FIG. 4 is a cross section diagram illustrating a wearable smart device obtained according to A-A line shown in FIG. 1.
Figure 5:
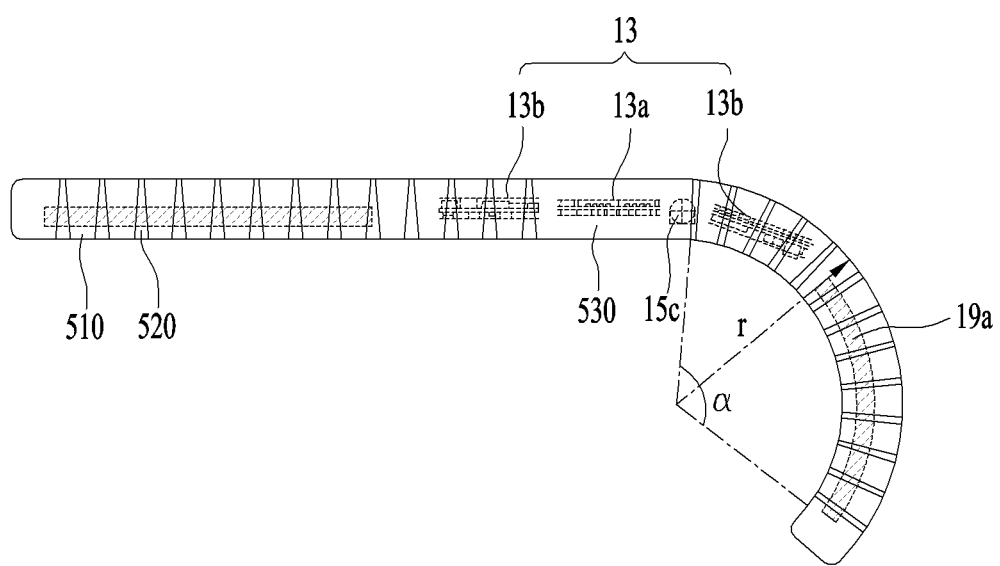
FIG. 5 is a side view diagram illustrating a wearable smart device transformed to be worn on a wrist of a user.

As shown in FIG. 2 and FIG. 4, the wearable smart device 10 can include frames 100/200 assigned to the inside of the device 10. A first example of the frames 100/200 is shown in more detail in FIGS. 6 to 9. The frames can be explained as a frame assembly including two frames 100/200. Basically, the frames 100/200 can be configured to support various electronic components required to drive the wearable smart device 10. In addition, the frames 100/200 can be configured to form a space accommodating the electronic components. In addition, a second example of frames 300/400 similar to the first example of the frames 100/200 is shown in FIGS. 10 to 14. The second example of the frames 300/400 can be assigned to the inside of the wearable smart device 10 instead of the first example of the frames 100/200 shown in FIGS. 6 to 9 and can perform functions identical to the aforementioned functions.

The wearable smart device 10 can include a cover 500 forming an appearance of the wearable smart device. As well shown in FIG. 3, the cover 500 is configured to wrap the frames 100/200. Hence, the cover 500 can protect not only the frames 100/200 but also electronic components supported or accommodated by the frames 100/200. Similarly, the cover 500 can wrap the second example of the frames 300/400 instead of the first example of the frames 100/200 with an identical scheme.

In FIG. 2, in order to easily show the inside of the wearable smart device 10, a part of components including a module 15e of the display unit 15a is eliminated. Hence, all components of the wearable smart device 10 are shown in more detail in FIGS. 4 and 5 compared to FIG. 2.

Referring to FIG. 4, the wearable smart device 10 can include the display unit 15a. The display unit 15a can be exposed from the device 10 to make the display unit 15a to be easily seen to a user in a state of being worn on the user. The display unit 15a can be supported by the first example of the frames 100/200 or the second example of the frames 300/400. The exposed display unit 15a can form appearance of the wearable smart device 10 together with the cover 500. The display unit 15a can provide various information to a user. More specifically, the display unit 15a can display information processed by the wearable smart device 10. For instance, the display unit 15a basically outputs various images and text information and can display information on an execution screen of an application program executed in the wearable smart device 10, UI (user interface) according to the information on the execution screen or information on GUI (graphic user interface).

The display unit 15a can include at least one of a LCD (liquid crystal display), a TFT LCD (thin film transistor-liquid crystal display), an OLED (organic light-emitting diode), a flexible display, a 3D display, and an E-ink display. And, two or more display units 15a can be provided to the wearable smart device 10 if necessary. For instance, an additional display may be provided to a bottom part of the device 10 opposite to an upper part of the display unit 15a in FIG. 4 to make the additional display to be exposed to a user in a position opposite to a position of the display unit 15a in the drawing.

The display unit 15a can include a display module 15e and a window 15f covering the display module 15e. The display module 15e can be made of such a display element as the aforementioned LCD or the OLED. The display module corresponds to a configuration element actually displaying picture information. The window 15f can be arranged at a part exposed to a user of the display module 15e and can protect the display module 15e from external. The window 15f not only performs the protection function but also allows a user to see information displayed on the display module 15e.

Hence, the window 15f can be made of a material of proper hardness and transparency. If the window 15f is made of a transparent material only, not only the display module 15e but also a different part or internal components of the wearable smart device 10 can be exposed to a user. The exposure may degrade the appearance of the device 10. Hence, it may be preferable to configure a part of the window 15f to be opaque except a prescribed area of the window configured to expose picture information of the display module 15e. More specifically, an opaque layer can be applied or attached to an edge part surrounding the display module 15e in a rear side of the window 15f. The opaque layer can be called as a bezel. As shown in FIG. 4, the display module 15e can be directly attached to the rear side of the window 15f. The display module 15e can be directly attached to the window 15f in various ways and adhesive can be most conveniently used to directly attach the display module to the window.

The display unit 15a can include a touch sensor (not depicted) configured to detect a touch input on the display unit 15a to receive a control command input by a touch scheme. If a touch is input on the display unit 15a, the touch sensor detects the touch and the controller 18 can be configured to generate a control command corresponding to the touch based on the touch. Contents input by the touch scheme may correspond to a text, a number or a menu item capable of being indicated or designated in various modes.

Meanwhile, the touch sensor is configured by a film form including a touch pattern and can be arranged between the window 15f and the display module 15e. Or, the touch sensor may correspond to a metal wire directly patterned on the rear side of the window 15f. Or, the touch sensor can be integrated with the display module 15e. For instance, the touch sensor may be arranged on a board of the display module 15e or can be installed in the inside of the display module 15e. As mentioned in the foregoing description, the display unit 15a can form a touch screen together with the touch sensor. In this instance, the touch screen may function as the user input unit 12c (refer to FIG. 1). In some cases, a physical key (e.g., a push key) can be additionally provided to a position adjacent to the display unit 15a, which is a touch screen, for a convenient input of a user as the user input unit 12c.

The wearable smart device 10 can also include an audio output module 15b installed in the inside of the wearable smart device. The audio output module 15b can be implemented by a receiver delivering a calling signal to an ear of a user. And, a loud speaker can be installed in the wearable smart device 10 as an additional audio output module to output various alarm sounds and playback sound of multimedia. And, the wearable smart device 10 can include a microphone 12b installed in the inside of the wearable smart device. The microphone 12b can input not only voice of a user but also different sound to the device 10. The audio output module 15b and the microphone 12b can be supported or accommodated by the first example of the frames 100/200 or the second example of the frames 300/400.

More specifically, when a phone call is made using the wearable smart device 10, the audio output module 15b can be installed in the wearable smart device 10, more specifically, in either a length direction end point of the first example of the frames 100/200 or a length direction end point of the second example of the frames 300/400 to make the audio output module to be arranged near an ear of a user. Similarly, when a phone call is made, the microphone 12b can be installed in the wearable smart device 10, more specifically, in either a length direction end point of the first example of the frames 100/200 or a length direction end point of the second example of the frames 300/400 to make the microphone to be arranged near a mouth of a user.

In particular, the audio output module 15b and the microphone 12b can be installed in the wearable smart device 10, more precisely, in the length direction end point of the first example of the frames 100/200 and the length direction end point of the second example of the frames 300/400, respectively, opposite to each other. The arrangement of the audio output module 15b and the microphone 12b shall be explained later in more detail with relevant configuration elements.

The wearable smart device 10 can include a haptic module in the inside of the wearable smart device. The haptic module 15c can be configured to provide a tactile feedback in response to a user input. As shown in the drawing, the haptic module 15c can be configured by a vibration motor and various devices can be applied as the haptic module 15c. The haptic module 15c can inform a user of various states of the wearable smart device 10 using not only the tactile feedback but also a vibration. The wearable smart device 10 can also include a board 13 in the inside of the wearable smart device. The board 13 corresponds to a configuration element in which various electronic components, i.e., various processors constructing the controller 180 are installed together with a different circuit and elements assisting the processors.

The board can control overall operation of the wearable smart device 10, more specifically, all configuration elements 11 to 19 of the wearable smart device. Moreover, the wearable smart device 10 can include a battery 19a (refer to FIG. 1) as a power supply unit 19 configured to supply power. The batter 19a may be configured to be embedded in the device 10 (built-in) or may be configured to be detachable from the device 10. The battery 19a can be charged via a power cable connected to a terminal. And, the battery 19a can be configured to be charged in wireless via a wireless charger. The wireless charging can be implemented by a magnetic induction scheme or a resonance scheme (magnetic resonance scheme). As shown in the drawing, the haptic module 15c, the board 13 and the battery 19a can be supported or accommodated by the first example of the frames 100/200 or the second example of the frames 300/400.

Along with the aforementioned various components, the wearable smart device 10 can be worn on a body of a user. The wearable smart device 10 can be configured to be worn on the body, in particular, a wrist of the user as a watch or a bracelet. Since the wrist of the user includes big curvature, as shown in FIG. 5, the wearable smart device 10 is also configured to have big curvature to make the device to be twined around the wrist. In order to transform the wearable smart device 100, transformation of both an appearance and a frame of the wearable smart device is basically required. Hence, a cover 500 forming the appearance and frames 100 to 400 forming the frame can be configured to be actually transformed to have big curvature. In FIG. 5, a right part shown in the drawing is transformed to be twined around the wrist of the user and a left part is not transformed to compare the right part with the left part. Meanwhile, since the most part of the wearable smart device 10 is transformed to be worn on the wrist of the user, it is necessary to transform big components in addition to the frames 100 to 400 and the cover 500.

Yet, the wearable smart device 10 may include components, which are made of material incapable of being transformed, such as a board 13 and the like. Hence, the wearable smart device 10 can include a non-transformable part to accommodate the components incapable of being transformed. And, it may be necessary for the wearable smart device 10 to have the non-transformable part for a different functional purpose. For this reason, the cover 500 of the wearable smart device 10 can include the non-transformable part 530 at least. Hence, although all of the frames 100/200/300/400 are capable of being transformed, the wearable smart device 10 itself may have some non-transformable parts by the non-transformable part of the cover 500 that forms appearance of the wearable smart device. In order for the transformed wearable smart device 10 to have a good appearance, it is preferable to transform the device 10 symmetrically. Hence, the non-transformable part (including the non-transformable part 530 of the cover) can be positioned at a length direction center point of the wearable smart device 10. In particular, as shown in FIG. 5, the rest of parts except the non-transformable part positioned at the center, i.e., a left part and a right part in the drawing can be transformed to be worn on a user.

If the wearable smart device 10 includes a mechanism capable of maintaining a transformed state, as shown in FIG. 5, a user can continuously wear the device 10 after changing other parts except the non-transformable part of the device 10. Further, the wearable smart device 10 can include a coupling mechanism installed in length direction both ends of the wearable smart device 10. After the wearable smart device 10 is transformed, the length direction both ends of the device 10 can be connected with each other by the coupling mechanism and a user can continuously use the device 10.

Meanwhile, in order to take off the wearable smart device 10, it is necessary for the device 10 to be restored to a previous state or be unfolded at least. Hence, the wearable smart device 10 can be configured to be restored to an original state. Practically, the frames 100 to 400 forming an appearance and a frame of the wearable smart device and the cover 500 can be configured to be restored to an original state. In consideration of the aforementioned transformation and restoration, the wearable smart device 10, in particular, the frames 100 to 400 and the cover 500 can be configured to be transformed with prescribed curvature to make the device to be restored. Hence, the frames 100 to 400 and the cover 500 can be made of such a material including flexibility and elasticity of a certain degree as metal or plastic for restorable transformation, i.e., elastic bending.

In relation to overall transformation of the wearable smart device 10, it is also necessary to consider transformation of internal components and arrangement of the internal components. First of all, as shown in the drawing, the display unit 15a may have a big size to conveniently provide more information to a user and the display unit can be extended over length direction of the device 10 to have the big size. Hence, in addition to the device 10, the display unit 15a can also be configured to be recoverably transformed. More specifically, the display unit 15a, in particular, the module 15e and the window 15f can be configured by a flexible display, which is made of such a transformable material as plastic. Further, it is difficult to make the board 13 with a transformable material.

Hence, among the board 13, a first board 13a can be preferentially accommodated to a non-transformable part positioned at the center. Since a part immediately adjacent to the non-transformable part is less transformed compared to other parts in the wearable smart device 10, as shown in FIGS. 4 and 5, second boards 13b can be accommodated to the adjacent parts. Since it is also difficult for a vibration motor 15c to be transformed, the vibration motor can be accommodated to the non-transformable part as well. Meanwhile, a battery 19a can be manufactured by a flexible material. Hence, in order to supply sufficient power to the wearable smart device 10, the battery 19a can be manufactured to have a big size and can be recoverably transformed together with the device 10.

In order to efficiently use a space in the device 10, the battery of the big size can be arranged at a plane identical to a plane of the board 13 belonging to the left part and the right part of the transformable part of the device 10. Although the audio output module 15b and the microphone 12b are unable to be transformed, the audio output module 15b and the microphone 12b have a very small size. Hence, the audio output module 15b and the microphone 12b can be arranged at both ends of length direction of the wearable smart device 10, respectively, where transformation does not occur.

As mentioned in the foregoing description, the wearable smart device 10 is transformed, i.e., is bent or folded to have big curvature fitting to a wrist of a user and can be worn on the wrist of the user. And, the device 10 can be taken off from the wrist of the user by being restored to an original state, i.e., by being unfolded. Moreover, as shown in FIGS. 3 and 5, if the device 10 is completely restored, i.e., if the device 10 is completely unfolded, the device may have a bar form. In particular, if the wearable smart device 10 is taken off from the wrist of the user, the device may have such a shape as a general mobile terminal.

Hence, if necessary, the user takes off the wearable smart device 10 from the wrist of the user and may be then able to use the device as a general mobile terminal. As a representative example, the user may take off the wearable smart device 10 from the wrist of the user and may be then able to make a call while holding the device by a hand. As mentioned in the foregoing description, the audio output module 15b and the microphone 12b are arranged at both ends of the wearable smart device 10, respectively. Hence, if the user brings the completely unfolded wearable smart device 10 to a face of the user while holding the device by a hand, the audio output module 15b and the microphone 12b can be closely arranged at an ear and a mouth of the user, respectively and the user can conveniently make a phone call. Basically, when the wearable smart device 10 is worn on the user by being transformed, the wearable smart device can perform all functions, e.g., communication and multimedia functions, of a mobile terminal.

Meanwhile, in case of the wearable smart device 10 configured to repeat transformation and restoration while the wearable smart device is used, unlike the cover 500, the frames 100 to 400 should repeat transformation and restoration together with various components which are accommodated or supported by the frames. Hence, it is necessary to design the frames 100 to 400 in consideration of the aforementioned function. Among the frames, frames 100/200 according to a first example are firstly explained in detail with reference to related drawings in the following.

Figure 6:
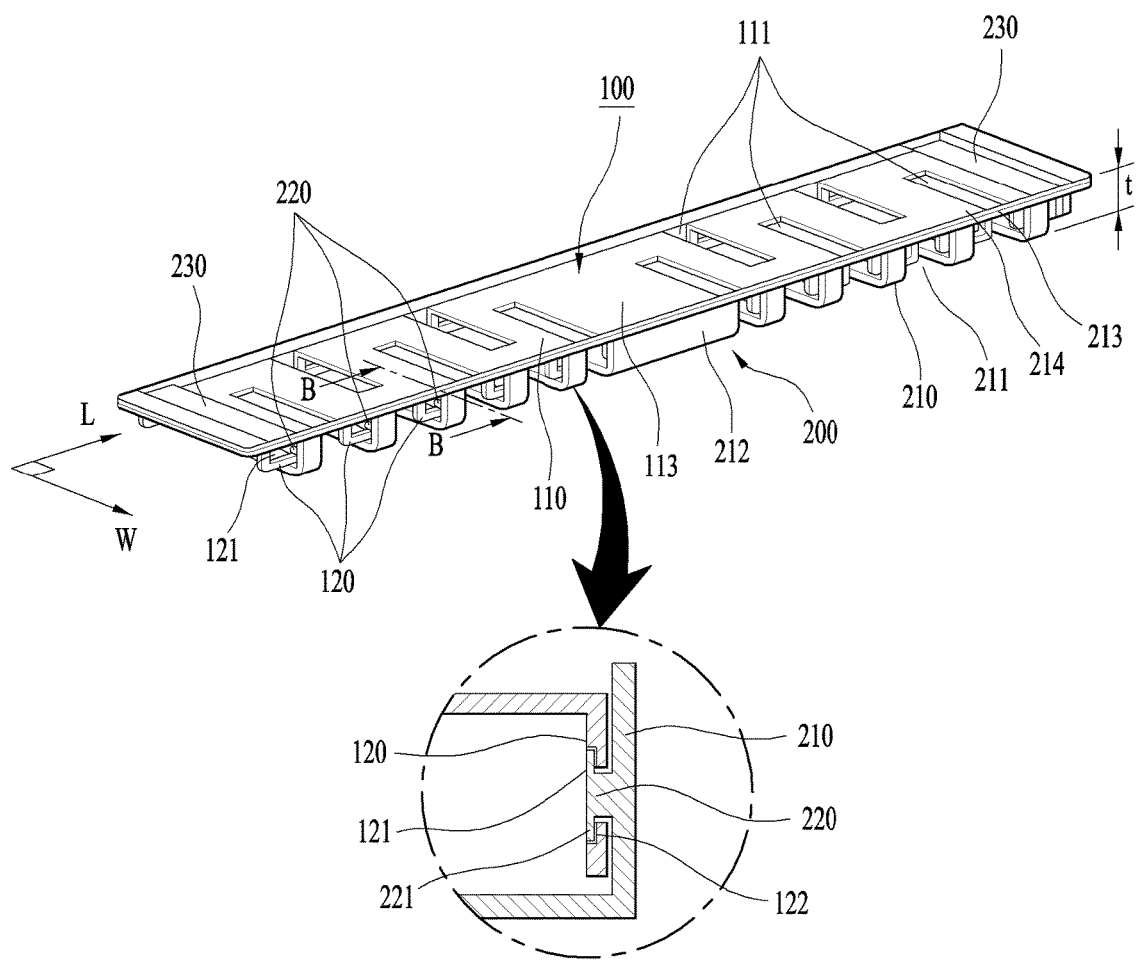
FIG. 6 is a perspective diagram illustrating a first and a second frame of a wearable smart device and a partial cross section diagram obtained according to B-B line.
Figure 7:
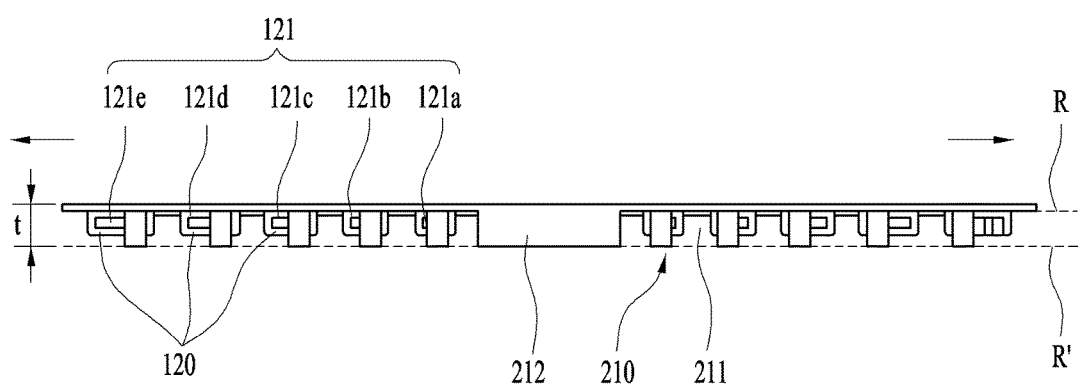
FIG. 7 is a side view diagram illustrating a first and a second frame.
Figure 9:
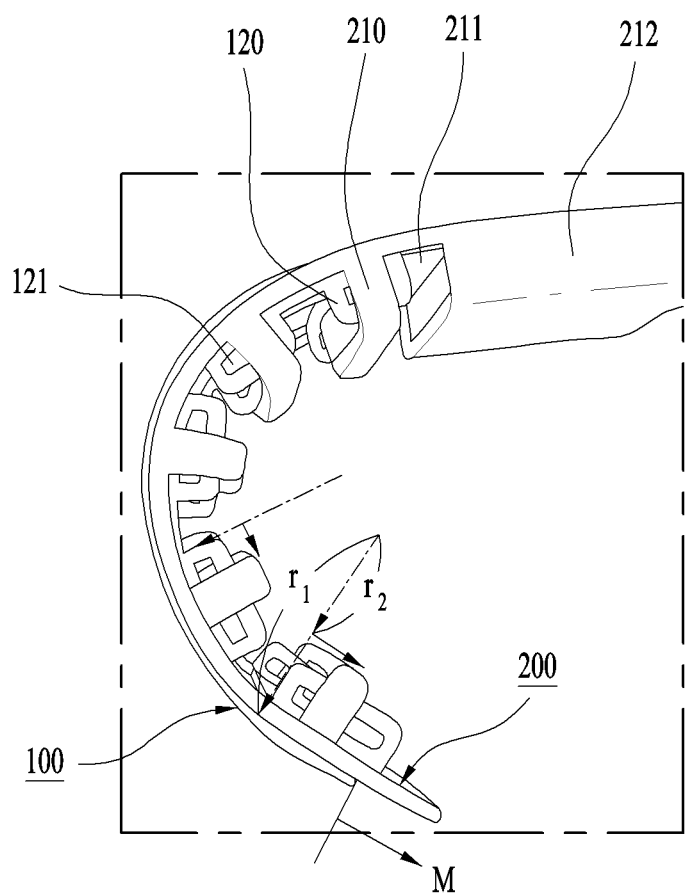
FIG. 9 is a side view diagram illustrating a first and a second frame transformed to be worn on a wrist of a user.

FIG. 6 is a perspective diagram illustrating a first and a second frame of a wearable smart device and a partial cross section diagram obtained according to B-B line, FIG. 7 is a side view diagram illustrating a first and a second frame, FIG. 8 is a schematic diagram illustrating a relation between a transformed first and a second frame and FIG. 9 is a side view diagram illustrating a first and a second frame transformed to be worn on a wrist of a user. Since FIGS. 1 to 5 show the wearable smart device 10 including the first example of the frames 100/200, FIGS. 6 to 9 may additionally refer to explanation on the first example of the frames 100/200 shown in FIGS. 1 to 5.

As mentioned in the foregoing description, since the frames 100/200 support or accommodate various components, an assembly of the frames may have a considerable size, in particular, a considerable thickness (t). The frames 100/200 are transformed together with the wearable smart device 10 with big curvature to be worn on a wrist of a user. Due to the considerable thickness of the transformed frames 100/200, there may exist a big difference between curvature/radius curvature of radial outermost plane (R) and curvature/radius curvature of innermost plane (R') in the assembly of the transformed frames 100/200. For reference, FIG. 7 shows the outermost plane (R) and the innermost plane (R') before the frames 100/200 are transformed and FIG. 8 shows the actual radial outermost plane (R) and the innermost plane (R') after the frames 100/200 are transformed.

The difference of the curvature/radius curvature may bring a result that transformation of one plane among the planes (R/R') restricts transformation of another plane. Hence, if the frames 100/200 are formed by a member constructed by a single body, it may interrupt the frames 100/200 from being transformed with a preferred big curvature. For this reason, the wearable smart device 10 can be configured by a first and a second frame 100/200 consisting of members different from each other. The frames 100/200 may form a frame assembly to support and accommodate components.

In case of transforming the frame assembly, a mutual relation between the first frame 100 and the second frame 200 shall be explained in detail with reference to FIG. 8. As mentioned in the foregoing description, since the first and the second frame 100/200 repeat transformation and restoration, the frames can be configured to be recoverably transformed to have a prescribed curvature. Hence, the first and the second frames 100/200 can be made of such a material including flexibility and elasticity of a certain degree as metal or plastic for restorable transformation, i.e., elastic bending.

First of all, when the first frame 100 is transformed to have curvature, the first frame can be structurally arrange at a radial outermost, i.e., the outermost plane (R). In particular, the first frame 100 can be arranged in the vicinity of the display unit 15a which is exposed to the external of the wearable smart device 10. Hence, the first frame 100 can be basically configured to support the display unit 15a. More specifically, in order to support the display unit 15a, which is extended in a length direction of the wearable smart device, the first frame 100 can be configured by a long plate member, which is also extended in the length direction of the wearable smart device 10, i.e., a body 110 corresponding to a member of a strip shape. As shown in FIG. 3, the display unit 15a, specifically, the display module 15e can be put on the first frame 100, in particular, the display unit can be attached to the first frame 100. And, the window 15f can be put on the display module 15e, in particular, the window can be attached to the display module 15e.

Hence, due to stacking and attachment of the display module 15e and the window 15f stacked and attached on the first frame 100, the display unit 15a can be attached to the first frame 100 while being supported by the first frame 100. The display module 15e and the window 15f can be attached in various methods. As a simple method, the display module 15e and the window 15f can be attached using an adhesive. Due to the attachment, the display unit 15a and the first frame 100 are formed as a single body. Hence, the display unit 15a and the first frame 100 can be configured to be recoverably transformed together.

Although the first frame 100 can be configured by a solid body 110, it may be required to have relatively more power to transform the solid body 110. Hence, as shown in FIGS. 2 and 6, the first frame 100 can include at least one or more notches 111 to easily transform the first frame. Power required when the first frame 100 is transformed to have curvature, i.e., power required when the first frame is elastically bent may be affected by a direction orthogonal to a length direction (L) of the first frame 100, i.e., a cross section of a width direction (W) shown in FIG. 6. If the cross section of the width direction (W) is reduced, much less power may be required for the same transformation. Hence, in order to reduce the cross section of the width direction (W), the notch 111 can be extended according to the width direction (W) of the first frame.

And, for easier transformation, it may be preferable to form a plurality of notches 111 on the first frame 100. Since a plurality of the notches 111 are formed in width direction, in order to provide a plurality of the notches 111 to the first frame 100, as shown in the drawing, a plurality of the notches are arranged according to a length direction (L) of the first frame 100 and can be separated from each other with a prescribed space. Moreover, when a shape of the first frame 100, i.e., a plate shape of the first frame is considered, a notch 111 is unable to be formed over whole of the width direction of the first frame 100. Hence, the notch 111 is inwardly extended from one side of the first frame 100, specifically, one side parallel to the length direction (L) of the first frame 100 and the notch may not reach to another side of the first frame. If the notch 111 is arranged at one side only of the first frame 100, it may be difficult for the first frame 100 to be uniformly transformed.

Hence, as shown in the drawing, the notch 11 can be alternately assigned to both sides of the first frame 100. Meanwhile, as mentioned in the foregoing description, since the wearable smart device 10 includes components hard to be transformed, it is necessary for the wearable smart device to have a non-transformable part to accommodate the components. For this reason, the notch 111 is formed on the rest of parts except a center part of a length direction of the first frame 100. Since the notch 111 is not formed on the center part, the center part can be considerably less transformed compared to different parts. Hence, a practical non-transformable part 112 can be formed. The non-transformable part 112 is situated at a position corresponding to a position of a non-transformable part 530 of the cover 500. As shown in FIG. 4, the non-transformable part 112 can accommodate such non-transformable components as the board 13 and the haptic module 15c together with the non-transformable part 530 of the cover 500.

The second frame 200 is configured to functionally accommodate components of the wearable smart device 10. The second frame 200 can include a body 210 configured to fond a space structurally accommodating the components and the body 210 can actually include a container shape. For instance, a board 13, a haptic module 15c, a battery 19a and the like can be accommodated in the body 210. In order to secure an accommodation space in the limited internal space of the wearable smart device 10, the second frame 200, i.e., a bottom part of the second frame can be separated from the first frame 100 with a prescribed space. In particular, the second frame 200 can be arranged at the below of the first frame 100 or a lower part of the device 10.

Since the lower part of the device 10 is adjacent to a wrist of a user, it may be explained as the second frame 200 is arranged at a position closer to the user compared to the first frame 100. Consequently, the second frame 200 forms a prescribed accommodation space and the first frame 100 may play a role in closing the formed accommodation space while supporting the display unit 15a. Hence, when the device is transformed to have curvature, at least a part of the second frame 200 can be structurally arranged at a radial innermost, i.e., the innermost plane (R'). Hence, the curvature and radius curvature of the second frame 200 transformed in the innermost plane (R') can be differentiated from curvature and radius curvature of the first frame 100 transformed in the outermost plane (R).

The second frame 200 can be configured by a solid body 210 to stably accommodate components. Yet, as shown in a relation between transformation of the first frame and transformation of the second frame described later with reference to FIG. 8, the second frame 200 can be transformed with curvature bigger than curvature of the first frame 100. In particular, the second frame 200, i.e., the bottom part of the second frame arrange at the innermost plane (R') can be transformed more than the first frame 100. Hence, as shown in FIGS. 2, 6, 7 and 9, the second frame 200, i.e., a body 210 can also include at least one or more cutout 211 to more conveniently transform the second frame 200.

Similar to the first frame 100, since power required when the second frame is elastically bent may be affected by a cross section of a width direction (W) shown in FIG. 6, the cutout 211 can be extended according to the width direction of the second frame 200. The cross section of the width direction (W) of the second frame 200 is considerably reduced by the cutout 211. Hence, the second frame 200 can be easily transformed with less power. In order to more conveniently transform the second frame, it may be preferable to form a plurality of cutouts 211 in the second frame 200, more specifically, a body 210 of the second frame. A plurality of the cutouts 211 of width direction can be arranged according to the length direction of the second frame 200 by being separated from each other. The body 210 can be divided into a plurality of ribs, which are separated from each other, due to a plurality of the cutouts 211 of width direction.

As shown in FIGS. 6 and 7, the second frame 200 can include a sub frame 210 surrounding a circumference of the first frame 100 and ribs 210 connected with the sub frame 213 and crossing the first frame 100 to surround components. Meanwhile, in order to form a non-transformable part configured to accommodate non-transformable components, the cutout 211c can be formed at the rest of parts except a center part of length direction of the second frame 200. Hence, since the center part, which does not include the cutout 211, is considerably less transformed compared other parts, the center part can be formed as the non-transformable part 212. The non-transformable part 212 is situated at a position corresponding to a position of the non-transformable part 530 of the cover 500 and a position of the non-transformable part 112 of the first frame 111. As shown in FIG. 4, the non-transformable part 212 can accommodate such non-transformable components as the board 13 and the haptic module 15c.

Since the second frame 200 has a body 210 of a container shape for surrounding components, as shown in the drawing, the second frame 200 can also accommodate the first frame 100 together with the display unit 15a. More specifically, the second frame includes an opening 214. The first frame 100 and the display unit 15a can be inserted into the second frame 200 via the opening 214. Hence, the display unit 15a and the first frame 100 can be more stably installed in the wearable smart device 10 together with other components. As mentioned in the foregoing description, both the display module 15e and the window 15f of the display unit 15a can be supported by the first frame 100 only.

Yet, in order to more stably support the display unit 15a, the display unit can be additionally supported by the second frame 200. Although the second frame 200 can be configured to support both the display module 15e and the window 15f of the display unit 15a, FIG. 4 and other drawing show the second frame 200 configured to support the window 15f only to make the wearable smart device have a compact appearance. More specifically, the second frame 200 can include a seating part configured to support the display unit 15a. Since a prescribed inner peripheral surface is relatively formed on a body 210 near the opening 214 due to the formation of the opening 214, the seating part 230 can be inwardly extended from the second frame forming the opening or the inner peripheral surface of the body 210. In particular, the seating part 230 is provided to the second frame or the inner peripheral surface of the body 210 of the second frame and can be configured by a flange, which is extended to an internal direction of the seating part. As shown in the drawing, the seating part 230 is arranged at both ends of length direction of the second frame 200 and can stably support the display unit 15a, i.e., the window 15f.

As discussed earlier in the foregoing description, when the first and the second frame 100/200 are transformed with a big curvature, due to a considerable thickness of an assembly of the first and the second frame, the transformed first frame 100 is arranged at a radial outermost surface (R) and a part of the second frame is arranged at a radial innermost surface (R'). These arrangements different from each other may bring a curvature difference corresponding to a degree of transformation in the first and the second frame 100/200. Hence, in order to smoothly perform transformation and restoration, it is necessary to design the first and the second frame 100/200 in consideration of an amount of transformation or a different of the degree of transformation. In FIG. 8, a geometrical mutual relation causing the aforementioned curvature difference is explained. The first and the second frame 100/200 are explained in more detail in the following with reference to FIG. 8 and other drawings to design the first and the second frame to solve the curvature difference or transformation amount difference.

First of all, FIG. 8 (a) is a schematic diagram illustrating a first and a second frame 100/200 before the first and the second frame are transformed. More specifically, the first frame 100 can be simplified by a straight line arranged at an outermost surface (R) of an assembly of the first and the second frame 100/200. In addition, at least a part of the second frame 200, i.e., a bottom part corresponding to an outer peripheral surface of the frame assembly 100/200 can be simplified by a straight line arranged at a radial innermost surface (R'). As shown in the drawing, the first and the second frame 100/200 are configured by a same length before the first and the second frame 100/200 are transformed.

FIG. 8 (b) is a schematic diagram illustrating the first and the second frame 100/200 transformed from a state of FIG. 8 (a). Due to a considerable thickness of the frame assembly 100/200, the first and the second frame 100/200 may have curvature radiuses r1/r2 different from each other. Although the curvature radiuses r1/r2 may have origins different from each other, for clarity, FIG. 8 (b) shows a single origin (O). As shown in the drawing, a curvature radius (r2) of the second frame is shortened as much as a thickness (t) compare to a curvature radius (r1) of the first frame. Since curvature is inversely proportional to a curvature radius, curvature (C2) of the second frame considerably increases compared to curvature (C1) of the first frame.

In particular, the first frame is recoverably transformed to have the first curvature (C1) and the second frame can be recoverably transformed to have the second curvature (C2) which is greater than the first curvature (C1). Hence, the second frame 200 can be transformed more compared to the first frame 100 due to the second curvature (C2). As shown in FIG. 8 (c), if the first and the second frame 100/200 are formed by a single body, the second frame 200, which is transformed with the bigger curvature (C2), is bound by the first frame 100 transformed with the first curvature (C1).

This phenomenon can also be explained by a difference between circumferences when the first and the second frame 100/200 are transformed. Since the curvature radius (r2) of the second frame 200 is smaller than the curvature radius (r1) of the first frame 100, if the frames 100/200 are transformed together with a prescribed angle of circumference, a circumference of the second frame 200 becomes less than a circumference of the first frame 100 under an identical angle of circumference. In particular, if the first and the second frame 100/200 are formed by a single body, the circumference of the second frame 200 should be shortened to form a smooth curvature when the first and the second frame 100/200 are transformed.

Hence, the second frame 200 receives pressure relatively higher than pressure received by the first frame 100. Hence, as shown in the drawing, the second frame may be severely twisted. Since the second frame 200 is adjacent to a body of a user, the severe twist may be uncomfortable to the user. For this reason, as mentioned in the foregoing description, the first and the second frame 100/200 can be respectively made of members different from each other to prevent mutual interruption from occurring between the first and the second frame when the first and the second frame are transformed.

In addition, if the first and the second frame 100/200 are completely separated from each other, the first and the second frame may not have sufficient structural strength and may be difficult to stably accommodate or support internal components. Hence, the first and the second frame 100/200 are configured by separate members combined with each other. Further, the curvature (C1/C2) different from each other between the first and the second frame 100/200 and transformation difference due to the curvature are selected for smooth transformation of the assembly of the first and the second frame 100/200. In particular, it may be preferable to have a coupling structure capable of allowing a bigger curvature of the second frame 200, i.e., more transformation of the second frame without length reduction and relative pressure compared to the first frame 100. In relation to this, if the second frame 200 can relatively move without being bound to the first frame 100, the second frame 200 can be transformed to have geometrically required curvature (C2).

For these reasons, the second frame 200 can be configured to be more transformed, i.e., the second frame 200 can be configured to have bigger curvature (C2) compared to the first frame 100 while being combined with the first frame 100 at the same time. In particular, the second frame 200 can be configured to be movably coupled with the first frame 100. This coupling mechanism provides structural stability to the assembly of the first and the second frame 100/200 itself and enables smooth and stable transformation to be performed at the same time when a user wears the device 10. In the following, a coupling mechanism enabling movable coupling of the second frame 200 to be performed on the first frame 100 is explained in more detail with reference to related drawings.

Referring to FIG. 6 and FIG. 7, as a coupling mechanism, the first frame 100 can include at least one or more slots 121. The slot 121 can be provided to the first frame 100, i.e., a body 110 supporting the display unit 15a. In addition, as shown in the drawing, since the slot 121 is provided to couple with the second frame 200 wrapping a side of the first frame 100, the slot 121 can be provided to the side of the first frame 100 facing the second frame 200 for easy coupling. In order to provide the slot 121 to the side of the first frame 100, the first frame 100 may have at least one or more flanges provided to the side of the first frame 100. The slot 121 can be formed on the flanges. And, as a coupling mechanism, the second frame 200 can include at least one or more hooks or bumps 220. The bump 220 can be basically inserted into the slot 121. The bump 220 is formed on the second frame 200, i.e., a side of the body 210 of the second frame 200 facing a side of the first frame 100 to easily couple with the slot 121.

The bump 220 is coupled with the slot 121 by the insertion of the bump and the second frame 200 connected with the bump 220 can also be coupled with the first frame 100 including the slot 121. Since the slot 121 is extended according to a length direction of the first frame 100 or the second frame 200, the bump 220 may move in the length direction (L) according to the slot 121. In particular, since the bump 220 and the second frame 200 are formed as a single body, the second frame 200 and the bump 220 can move according to a guide of the slot 121. The movement of the second frame 200 and the bump 220 is performed according to the length direction (L) of the first and the second frame 100/200.

More specifically, as shown in a partially magnified cross section diagram of FIG. 6, a seating part 122 can be formed in the vicinity of the slot 121. As shown in the drawing, the seating part 122 may have a recessed form. The bump 220 can be engaged with the seating part 122 and can be supported by the seating part 122. In order to be engaged with the seating part or to support the seating part 122, the bump 220 can additionally include a flange 221. The flange can be extended from the bump 220 in a radial direction, can be put on the seating part 122 or can be engaged with the seating part 122. Hence, the bump 220 can move according to the slot 11 without being separated from the slot 121.

For this reason, the bump 220 can be more stably coupled with the slot 121. For the same reason, the second frame 200 can be movably coupled with the first frame 100 by the bump 220 and the slot 121. For more stable coupling, a plurality of bumps 220 and a plurality of slots 121 can be provided to the first and the second frame 100/200 and can be arranged according to the length direction (L) of the first and the second direction 100/200. Moreover, in the drawing and the description, although the slot 121 and the bump 220 are provided to the first and the second frame 100/200, respectively, the slot 121 can be provided to the second frame 200 instead of the first frame 100 and the bump 220 can be provided to the first frame 100 instead of the second frame 200. Consequently, as a coupling mechanism of the first and the second frame 100/200, the wearable smart device 10 can include a slot provided to one of the first frame 100 and the second frame 200 and a bump provided to another one of the first frame 100 and the second frame 200 to couple with the slot. In this instance, the bump can move according to the slot.

In order for a user to wear the wearable smart device 10, the user firstly transforms the device 10 as shown in FIG. 5. Although FIG. 5 shows a case that a right part of the device is transformed only based on a center part, a left part is also transformed to be worn on the user. Transformation of the wearable smart device 10 can include not only transformation of the cover 500 but also transformation of the first and the second frame 100/200 in the cover 500. Referring back to FIG. 8 (b), when the device is transformed to be worn on the user, first of all, the first frame 100 can be transformed to have first curvature (C1). In addition to the transformation of the first frame 100, the second frame 200 is also transformed with second curvature (C2). Due to geometric arrangement of the first and the second frame 100/200, since the second curvature (C2) is greater than the first curvature (C1), it is necessary to more transform the second frame 200 compared to the first frame 100. As mentioned in the foregoing description, the coupling mechanism including the slot 121 and the bump 220 can enable the relatively big transformation to be performed.

More specifically, although the bump 220 is coupled with the slot 121, the bump 220 can freely move in the slot 121. Practically, the bump 220 can slide according to the slot 121 in the middle of transforming the device. The second frame 200 can be slidably coupled with the first frame 100 in the middle of transforming the device due to the movement of the bump 220 moving according to the slot 121. As shown in FIG. 9, the bump 220 can outwardly move according to a length direction (L) of the first and the second frame 100/200 in the middle of transforming the device while being guided by the slot 121. Hence, as shown by an arrow direction of FIG. 9 and FIG. 8 (b), the second frame 200 can outwardly move in a length direction in response to the first frame 100 while the device is transformed.

Consequently, the second frame 200 can be movably coupled with the first frame 100 by the coupling mechanism including the slot 121 and the bump 220. While the second frame 200 is transformed together with the first frame 100, the second frame 200 can relatively move in response to the first frame 100. It can allow the second frame 200 to make relatively bigger transformation with bigger curvature (C2) without changing the relative moving length. Hence, as shown in FIG. 8 (b) and FIG. 9, the second frame 200 can move relatively more than the first frame 100 as much as a size of an arrow (M). Consequently, the second frame 200 can be transformed to have smooth curvature (C2) without being bound to the first frame 100. The slot 121 and the bump 220, i.e., the coupling mechanism can combine the first and the second frame 100/200 with each other to stably accommodate and support internal components. At the same time, the coupling mechanism enables the second frame 200 to perform movable coupling and relative movement with the first frame 100. Hence, when the device 10 is transformed to be worn on a user, the coupling mechanism can enable the second frame 200 to form smooth curvature and a curved surface.

Hence, the coupling mechanism can provide a structural stability to the assembly itself of the first and the second frame 100/200 and may be then able to provide comfortable wearing, which is resulted from smooth and stable transformation, to the user when the user wears the device 10. Moreover, when the device is worn on the user, the first and the second frame 100/200 can be easily transformed with curvature fitting to the user with the help of the aforementioned structural characteristics. By doing so, the user can conveniently use the device 10.

Meanwhile, referring back to FIG. 8 (a), a first and a second point (P1 and P2) included in the first frame 100 and a first and a second point (P1' and P2') included in the second frame 200 are arranged at identical vertical lines, respectively, before the device is transformed. In particular, each of the points of the second frame 200 may have a relative position identical to each points of the first frame 100 before the device is transformed. Yet, as shown in FIG. 8 (b), if the device is transformed, the points (P1' and P2') of the second frame 200 can be separated or eccentric from the points (P1 and P2) of the first frame 100 in a vertical direction due to curvature (C1 and C2) different from each other.

And, due to a difference between first curvature (C1) and second curvature (C2), an angle of circumference ($\alpha 1$) is increased to an angle of circumference ($\alpha 2$). Hence, separation and eccentricity of the corresponding points (P1' and P2') of the second frame 200 are also increased for the points (P1 and P2) of the first frame 100. More specifically, as shown in the drawing, eccentricity of a point (P2, P2') separated from a center part may be greater than eccentricity of a point (P1, P1') adjacent to the center part in a length direction of the first and the second frame 100/200. In particular, as outwardly moving from the center part of the first and the second frame 100/200, the eccentricity can be gradually increased.

Moreover, this means that a relative moving amount of the second frame 200 (or bump 220) is gradually increased for the first frame 100 (or slot 121) as getting far from the center part. A difference of the moving amount is represented by arrows different from each other in size according to a position in FIG. 9. According to the coupling mechanism, the bump 220 positioned at each of the points (P1' and P2') can move as much as the aforementioned eccentricity for the slot 121. If the slot 121 is designed without considering the difference of the eccentricity, a bump 220 positioned in the vicinity of the center part of the second frame 200 can sufficiently move while the device is transformed. On the contrary, a bump 220 separated from the center part of the second frame 220 may be bound by the slot 121 while the device is transformed.

Hence, as well shown in FIG. 7, as outwardly moving from the center part of the first frame 100 or the second frame 200 in a length direction or as getting far from the center part, a size of the slots 121a to 121e can be gradually increased. In particular, a size of a slot 121e separated from the center part can be larger than a size of a slot 121a adjacent to the center part. According to the aforementioned configuration, the bump 220 or the second frame 200 can more smoothly move compared to the first frame 100 or the slot 121 and can be stably transformed to the second curvature.

In addition to the frames 100/200 according to the aforementioned first example, frames 300/400 according to a second example are explained in detail in the following description. Although the frames 300/400 according to the second example provide a function identical to the function of the first example, the frames 300/400 can be structurally distinguished from the frames 100/200 according to the first example. In particular, the frames 300/400 according to the second example can be arranged at the inside of the cover 500 instead of the frames 100/200 according to the first example and can provide an intended function to the wearable smart device 10. For this reason, characteristics of the second example distinguished from the first example are mainly explained in the following description. A structure and functions of the second example, which are not separately explained, are all identical to the first example. Hence, explanation and drawings on the first example are all identically included in explanation and drawings on the second example unless a special opposite citation is mentioned.

Figure 10:
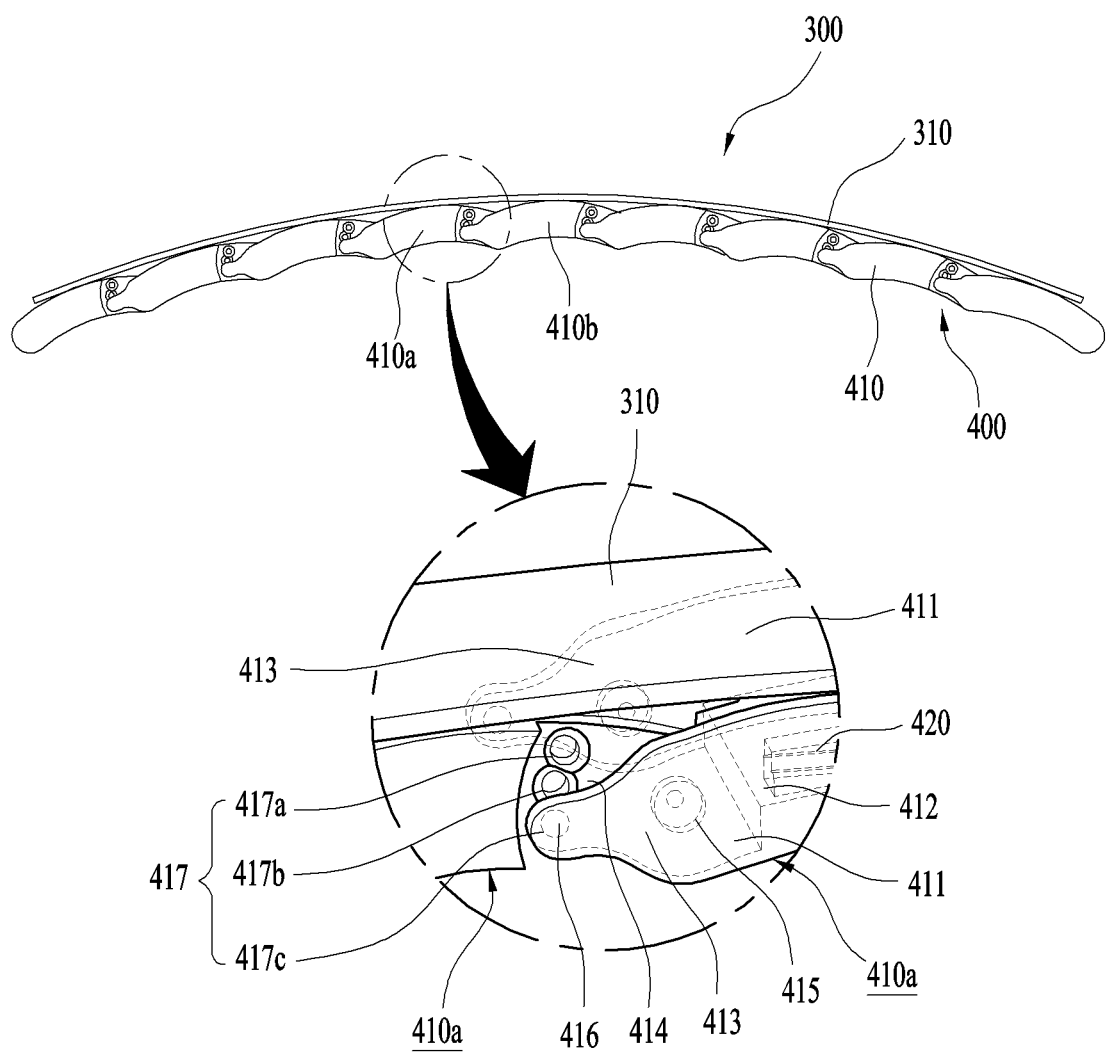
FIG. 10 is a side view diagram illustrating an example of transforming a first and a second frame of a wearable smart device and a partially magnified perspective diagram.
Figure 11:
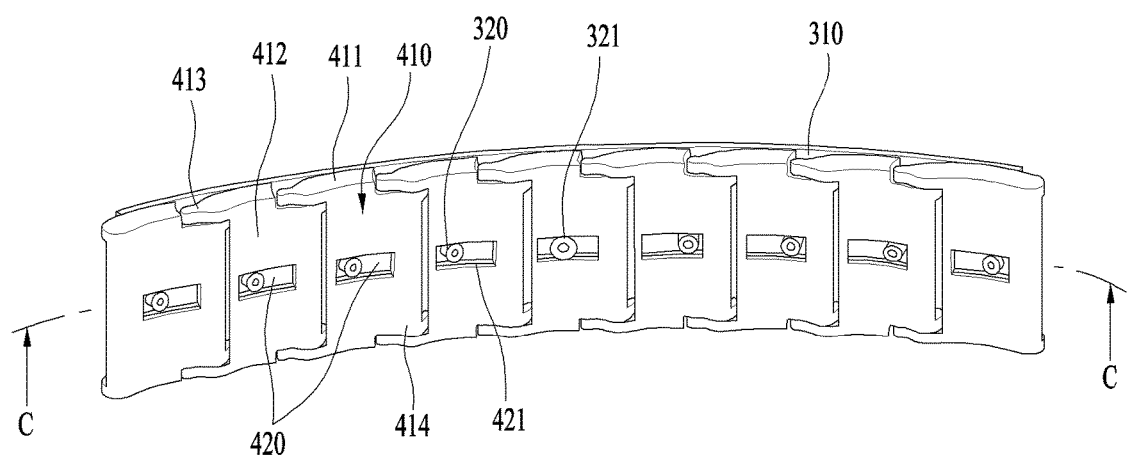
FIG. 11 is a perspective diagram illustrating a bottom part of a first and a second frame shown in FIG. 10.
Figure 12:
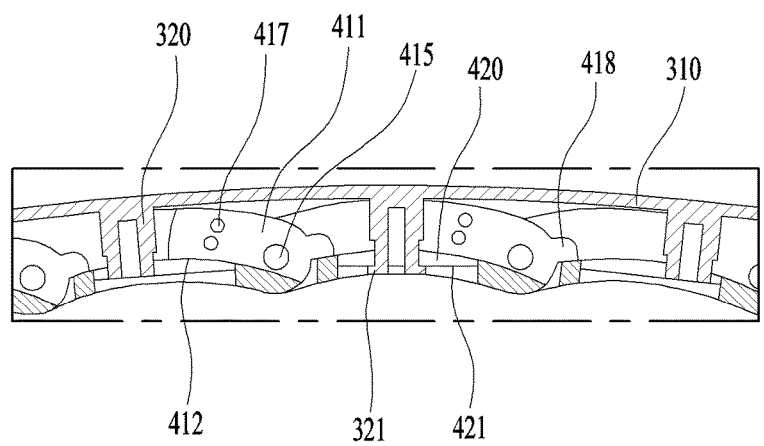
FIG. 12 is a cross section diagram obtained according to C-C line shown in FIG. 10.
Figure 13:
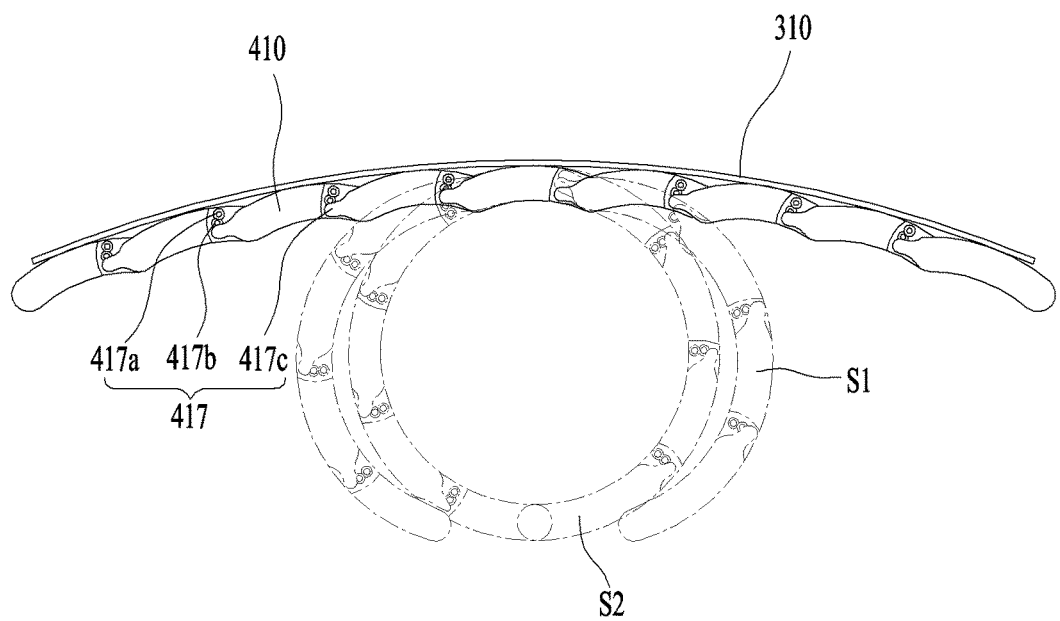
FIG. 13 is a side view diagram illustrating an example of transforming a first and a second frame transformed to be worn on a wrist of a user.
Figure 14:
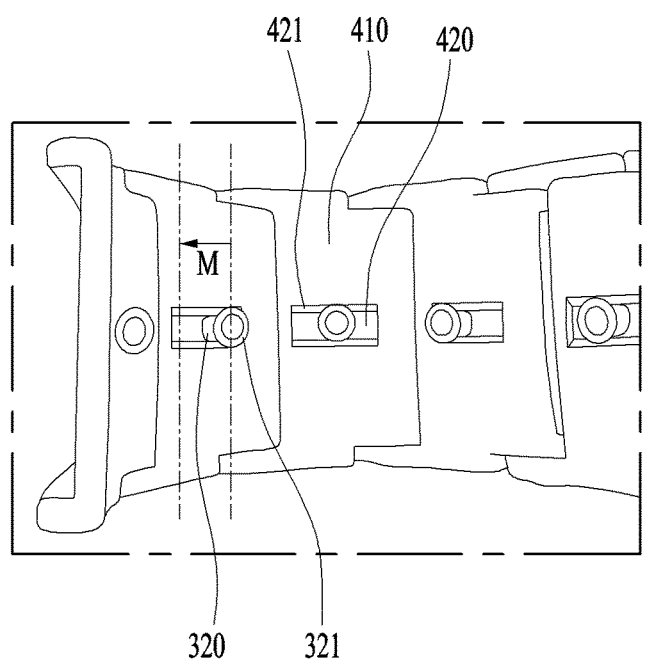
FIG. 14 is a bottom view diagram illustrating a first and a second frame transformed to be worn on a wrist of a user.

FIG. 10 is a side view diagram illustrating an example of transforming a first and a second frame of a wearable smart device and a partially magnified perspective diagram, FIG. 11 is a perspective diagram illustrating a bottom part of a first and a second frame shown in FIG. 10, FIG. 12 is a cross section diagram obtained according to C-C line shown in FIG. 10, FIG. 13 is a side view diagram illustrating an example of transforming a first and a second frame transformed to be worn on a wrist of a user and FIG. 14 is a bottom view diagram illustrating a first and a second frame transformed to be worn on a wrist of a user.

Similar to the frames 100/200 according to the first example, the second example can also include a first and a second frame 300/400 consisting of separate members different from each other to prevent the first and the second frame from being bound with each other when the device is transformed. The frames 300/400 can form a frame assembly to support and accommodate components. Moreover, as mentioned in the foregoing description, the first and the second frame 300/400 can be configured to be recoverably transformed to have prescribed curvature to repeatedly perform transformation and restoration. Hence, the first and the second frame 300/400 can be made of such a material including flexibility and elasticity of a certain degree as plastic or metal.

First of all, the first frame 300 can be structurally arranged at a radial outermost, i.e., the outermost plane (R) (refer to FIG. 7 and FIG. 8) to have curvature when the device is transformed. In particular, the first frame 300 can be arranged in the vicinity of the display unit 15a which is exposed to the external of the wearable smart device 10. Hence, the first frame 300 can be basically configured to support the display unit 15a. More specifically, in order to support the display unit 15a, which is extended in a length direction of the wearable smart device, the first frame 300 can be configured by a long plate member, which is also extended in the length direction of the wearable smart device 10, i.e., a body 310 corresponding to a member of a strip shape.

As mentioned earlier with reference to FIG. 3 in relation to the first example, the display unit 15a, specifically, the display module 15e can be put on the first frame 300, in particular, the display unit can be attached to the first frame 300. And, the window 15f can be put on the display module 15e, in particular, the window can be attached to the display module 15e. Hence, due to stacking and attachment of the display module 15e and the window 15f stacked and attached on the first frame 300, the display unit 15a can be attached to the first frame 300 while being supported by the first frame 300. The display module 15e and the window 15f can be attached in various methods. As a simple method, the display module 15e and the window 15f can be attached using an adhesive.

Due to the attachment, the display unit 15a and the first frame 300 are formed as a single body. Hence, the display unit 15a and the first frame 300 can be configured to be recoverably transformed together. And, as well shown in FIG. 10, the first frame 300 can be configured by a solid body 310. Yet, it may be required to have relatively strong power to transform the solid body 310. Hence, although it is not depicted in relation to the example 2, the first frame 300 can include at least one or more notches such as the notches mentioned earlier in FIG. 2 and FIG. 6 in relation to the first example. The notch included in the first frame 300 can identically have all characteristics explained in relation to the first example.

The second frame 400 is configured to functionally accommodate components of the wearable smart device 10. As shown in the drawing, the second frame 400 can include a plurality of links 410 connected with each other. The links 410 can form a body of the second frame 400 structurally forming a space in which components are accommodated. Each of a plurality of the links 410 has an internal space which is formed in the inside of each link. When a plurality of the links are connected with each other, each of the internal spaces is connected with each other and a big space can be formed. For instance, a board 13, a haptic module 15c, a battery 19a and the like can be accommodated in an internal space formed by a plurality of the links 410 connected with each other.

More specifically, as shown in the partially magnified diagram of FIG. 10, the link 410 can include a bottom part 412 and side walls 411 respectively provided to both sides of the bottom part 412. The side walls 411 are separated from each other with a prescribed space. Hence, an internal space can be formed by the side walls and the bottom part 412. A first hinge 413 is formed at one end of the side wall 411 in a length direction and a second hinge 414 can be formed at another end of the side wall. The first hinge 413 can be pivotably connected with the second hinge 414 of an adjacent link 410 via a hinge axis 415. Hence, the links 410 can be configured to be pivotably connected with each other. For this reason, the second frame 400 can be more smoothly transformed with bigger curvature compared to the first frame 300.

In order to secure an accommodation space in the limited internal space of the wearable smart device 10, the second frame 400, i.e., a bottom part of the second frame can be separated from the first frame 300 with a prescribed space. In particular, the second frame 400 can be arranged at the below of the first frame 300 or a lower part of the device 10. Since the lower part of the device 10 is adjacent to a wrist of a user, it may be explained as the second frame 400 is arranged at a position closer to the user compared to the first frame 300. Consequently, the second frame 400 forms a prescribed accommodation space and the first frame 300 may play a role in closing the formed accommodation space while supporting the display unit 15a. Hence, when the device is transformed to have curvature, at least a part of the second frame 400 can be structurally arranged at a radial innermost, i.e., the innermost plane (R') (refer to FIG. 7 and FIG. 8).

The links 410 can be configured to control an angle between adjacent links 410 in the second frame 400. Referring back to the partially magnified diagram of FIG. 10, for this controlling mechanism, it can provide a plurality of grooves 417 to one of a first and a second link 410a/410b connected with each other. In particular, it can provide a plurality of the grooves 417 to the first link 410a. Since a plurality of the grooves 417 are intended to be interlocked with a structure of another link, i.e., the second link 410b, a plurality of the grooves can be provided to the second hinge 414 of the first link 410a, i.e., a connection part of the second link 410b to be adjacent to the second link 410b.

And, the first link 410a can include grooves 417a to 417c respectively arranged to heights different from each other. Meanwhile, a bump 416 can be provided to another link among the first and the second link 410a/410b connected with each other, i.e., the second link 410b. The bump 416 can be provided to the first hinge 413 of the second link 410b, i.e., a connection part of the first link 410a to be adjacent to the first link 410a. The bump 416 can be formed on the first link 410a instead of the second link 410b. Similarly, the grooves 417 can also be formed on the second link 410b instead of the first link 410a. The bump 416 can be combined with one of the grooves 417a to 417c. Since heights of the grooves 417a to 47c are different from each other, if the bump 416 is combined with the grooves 417a to 417c different from each other, the two links connected with each other, i.e., the first and the second link 410a/410b may form angles different from each other.

Hence, although external force is not consistently provided, i.e., if external force is provided one time only, an angle between the two links 410a/410b connected with each other can be controlled by the controlling mechanism including the aforementioned grove 417 and the bump 416. In particular, an angle formed between a link 410a and a different link 410b connected with the link 410a can be controlled by the controlling mechanism. For this reason, in order to control an angle, the second frame 400 can include a plurality of grooves 417 provided to one of adjacent links 410a/410b connected with each other and the bump 416 provided to another link and combined with one of a plurality of the grooves 417 to change an angle for one of the links. In other word, it may be explained as the second frame 400 includes the first link 410a including a plurality of the grooves 417 and the second link 410b including the bump 416 configured to be combined with one of a plurality of the grooves 417 to change an angle with the first link 410a.

Since an angle between adjacent links 410 connected with each other is controllable, whole angle formed by the links 410 can also be controllable. Since the links 410 forms a body of the second frame 400, whole amount of transformation or a degree of transformation of the second frame 400 can be controlled by controlling the whole angle of the links 410. In particular, as mentioned earlier in the first example, the second curvature (C2) formed by the second frame 400 can be controlled. For instance, as shown in FIG. 13, the second frame 400 can be transformed into a shape (S1) including relatively small curvature for a user of a thick wrist.

And, the second frame 400 can be transformed into a shape (S2) including relatively bigger curvature for a user of a thin wrist. Moreover, since transformation of the second frame 400 involves transformation of the wearable smart device 10, transformation of the device 10 itself can also be controlled by controlling the angle between the links 410. Meanwhile, if the bump 416 is inserted into the groove 417, the bump 416 may not be separated from the groove 417 unless additional external force is provided. In particular, if the additional external force is not provided, the links 410 can be configured to maintain the angle adjusted between the links. With the help of angle control between the links and maintenance of the controlled angle, the second frame 410, i.e., the wearable smart device 10 can control an amount of transformation or curvature by adding single external force to the links and continuously maintain the controlled amount of transformation and the curvature unless additional external force is added to the links.

Hence, the device 10 including the aforementioned second frame 400 can be worn on a wrist of a user while maintaining the transformed state without an additional structure biding the transformed wearable smart device 10. For this reason, the wearable smart device 10 can be simplified and compact. Moreover, manufacturing cost of the wearable smart device 10 can also be reduced. Since an additional operation to maintain the transformed device 10 is not required, a user can more conveniently wear the smart device 10. Moreover, as mentioned in the foregoing description, since the second frame 400 includes a plurality of links 410 pivotably connected with each other, the second frame can protect internal components while well transforming without such a structure as the cutout of the second frame 200 of the first example. When the aforementioned many merits and sufficient function are considered, the wearable device 10 may include a frame assembly 300/400 according to the second example and related different components only without the cover 500.

Since the frames 300/400 according to the second example have geometrical arrangement similar to the frames 100/200 according to the first example, curvature difference occurs in the first and the second frames 300/400 when the device is transformed. Since a geometrical mutual relation causing the curvature difference has already been explained with reference to FIG. 8, it is omitted in the following description. In the following, a coupling mechanism for overcoming the curvature difference is explained with reference to related drawings. The coupling mechanism of the second example is well shown in FIGS. 10 to 12.

As the coupling mechanism, the first frame 300 can include at least one or more bumps 320. The bump 320 can be provided to the first frame 300, i.e., a body 310 supporting the display unit 15a. Since the second frame 400 is arranged at the below of the first frame 300, the bump 320 is provided to a bottom surface of the first frame 300 to be coupled with the second frame 400. The bump 320 can be extended toward a bottom part 412 of a link 410. And, as the coupling mechanism, the second frame 400 can include at least one or more slots 420.

Basically, the bump 320 can be inserted into the slot 420. The slot 420 is formed on the bottom part 412 of the link 410 facing the bottom surface of the first frame 300 to make the bump 320 to be easily inserted into the slot 420. The bump 320 is coupled with the slot 420 by the insertion and the second frame 400 including the slot 420 can also be coupled with the first frame 300 connected with the bump 320. Since the slot 420 is extended according to a length direction of the first or the second frame 300/400, the bump 320 is movable according to the slot 420. In particular, the second frame 400 and the slot 420 are able to move according to a guide of the bump 320, which is inserted into the slot. Movement of the second frame 400 and the slot 420 is performed according to the length direction (L) of the first and the second frame 100/200.

More specifically, as shown in FIGS. 11 and 12, a seating part 421 can be formed in the vicinity of the slot 420. As shown in the drawing, the seating part 421 may have a recessed form. The bump 320 can be engaged with the seating part 421 and can be supported by the seating part 421. In order to be engaged with the seating part or support the seating part 421, the bump 320 can additionally include a flange 321. The flange 321 can be extended from the bump 320 in a radial direction, can be put on the seating part 421 or can be engaged with the seating part 421. Hence, the bump 320 can move according to the slot 420 without being separated from the slot 420. For this reason, the bump 320 can be more stably coupled with the slot 420.

For the same reason, the second frame 400 can be movably coupled with the first frame 300 by the bump 320 and the slot 420. For more stable coupling, a plurality of bumps 320 and a plurality of slots 420 can be provided to the first and the second frame 300/400 and can be arranged according to the length direction (L) of the first and the second direction 300/400. Moreover, in the drawing and the description, although the slot 420 and the bump 320 are provided to the first and the second frame 300/400, respectively, the slot 420 can be provided to the second frame 400 instead of the first frame 300 and the bump 320 can be provided to the first frame 300 instead of the second frame 400. Consequently, as a coupling mechanism of the first and the second frame 300/400, the wearable smart device 10 can include a slot provided to one of the first frame 300 and the second frame 400 and a bump provided to another one of the first frame 300 and the second frame 400 to be coupled with the slot. In this instance, the bump can move according to the slot.

In the attached drawings, it is depicted as the bump 320 and the slot 420 are arranged at the center of the second frame 400 in width direction, i.e., the bump and the slot are arranged according to a center line of the second frame 400 in a length direction. Yet, although it is not depicted, the bump 320 and the slot 400 can be arranged at a position adjacent to a side wall 411, which is separated from the center line, to form a sufficient accommodation space in the second frame 400 while not interrupting components accommodated in the second frame 400. And, in order to stably perform relative movement of the second frame 400 with the first frame 300, a pair of bumps 320 and a pair of slots 420 can be respectively arranged at positions adjacent to both side walls 411.

As mentioned earlier with reference to FIG. 8 (b), due to the movement of the bump 320 moving on the slot 420, the second frame 400 can be slidably coupled with the first frame 300 in the middle of being transformed. For the same reason, the second frame 400 can outwardly move in a length direction in response to the first frame 100 while the device is transformed. Consequently, the second frame 400 can be movably coupled with the first frame 300 by the coupling mechanism including the slot 430 and the bump 320. While the second frame 400 is transformed together with the first frame 300, the second frame 400 can relatively move in response to the first frame 300. It can allow the second frame 400 to make relatively bigger transformation with bigger curvature (C2) compared to the first frame 300.

As shown in FIG. 14, the bump 320, which is used to be positioned at a left end of the slot 420 before the device is transformed in FIG. 11, is arranged at a right end of the slot 420 after the device is transformed. Hence, the second frame 400 relatively moves more compared to the first frame 300 as much as a size of an arrow (M) in the middle of being transformed. Consequently, the second frame 400 can be transformed to have smooth second curvature (C2) without being bound by the first frame 300.

Relative separation or eccentricity occurred after the transformation, which has been explained with reference to FIGS. 8 (a) and (b) in the first example, can also be applied to the second example as it is. More specifically, if the first and the second frame 300/400 are transformed, points (P1' and P2') of the second frame 400 can be separated or eccentric from the points (P1 and P2) of the first frame 100 in a vertical direction due to curvature (C1 and C2) different from each other. And, eccentricity of a point (P2, P2') separated from a center part may be greater than eccentricity of a point (P1, P1') adjacent to the center part in a length direction of the first and the second frame 300/400. Hence, as outwardly moving from the center part of the first and the second frame 300/400 in a length direction or as getting far from the center part, a size of the slots 420 can be gradually increased. In particular, a size of the slot 420 separated from the center part may be greater than a size of the slot 420 adjacent to the center part. According to the aforementioned configuration, the second frame 400 can smoothly perform relative movement with the first frame 300.

Figure 16:
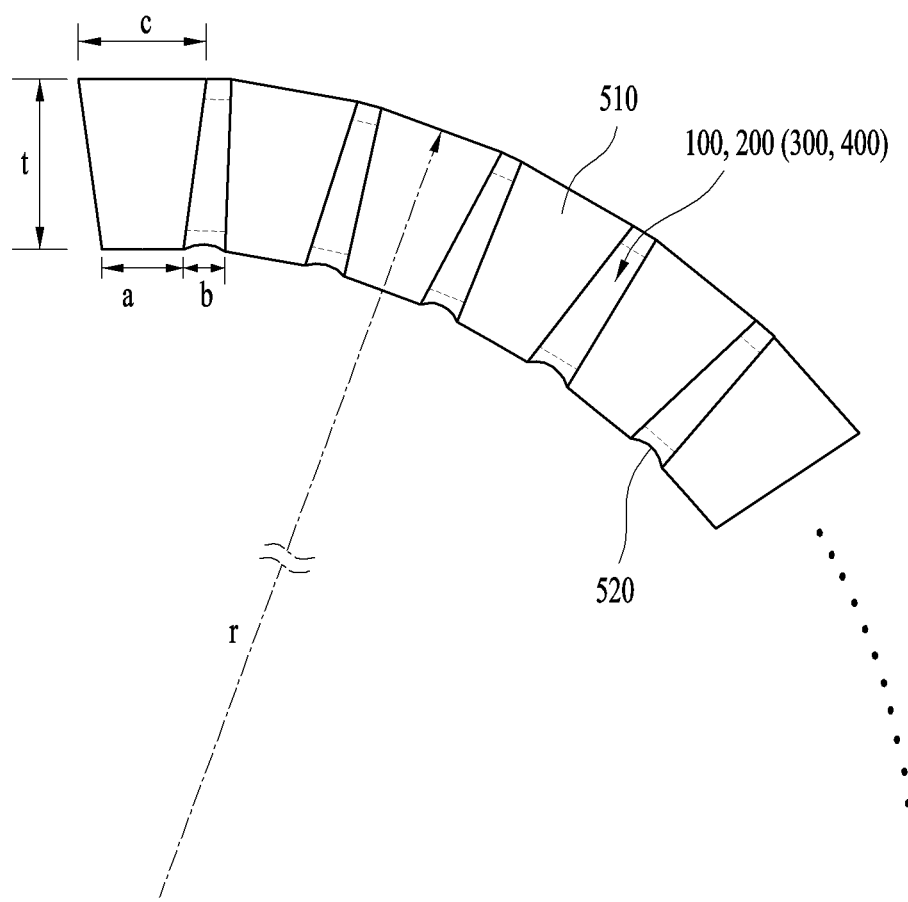
FIG. 16 is a schematic diagram illustrating a relation between link members of a cover in a wearable smart device.

An appearance of the wearable smart device 10 is finally formed by the cover 500. In order to smoothly transform the cover 500, similar to the first and the second frame 100 to 400, it is necessary to design the cover 500 in consideration of a difference between curvatures in a radial outermost and innermost. FIG. 15 is schematic diagram illustrating a part of a cover of a wearable smart device and FIG. 16 is a schematic diagram illustrating a relation between link members of a cover in a wearable smart device. Since a basic structure of the cover 500 is well shown in FIGS. 2 to 5, following description is described with reference to FIGS. 2 to 5 first prior to FIG. 15 and FIG. 16.

The cover 500 is configured to wrap frames 100 to 400 to protect the frames 100 to 400 and electronic parts supported or accommodated by the frames. The cover 500 includes an opening 501 to make the display unit 15a to be well exposed to a user. Hence, as shown in FIG. 4, the display unit 15a is exposed to the external from the device 10 via the opening 501.

Since the cover 500 repeats transformation and restoration together with the frames 100 to 400, the cover can be configured to be recoverably transformed to have prescribed curvature. Since the frames 100 to 400 can provide sufficient structural strength to the wearable smart device 10 using the aforementioned structure, the cover 500 can be designed to have a structure advantageous for transformation and restoration instead of additional structural strength advantageous for protecting basic internal components. Hence, the cover 500 can be made of such a highly elastic rubber material capable of being freely transformed in response to tension and compression as TPU (thermoplastic polyurethane), TPE (thermoplastic elastomers) and the like.

Yet, when the cover 500 is transformed, similar to what is explained on the frames 100 to 400 with reference to FIG. 8, innermost curvature may become greater than radial outermost curvature. Unlike the frames 100 to 400, the innermost is bound by the outermost due to the structure of the cover 500 configured to wrap the frames 100 to 400 and components. The innermost bound by the outermost is unable to relatively move in response to the outermost. Hence, the innermost is unable to form geometrically provided bigger curvature while maintaining a length of the innermost.

Hence, when the cover 500 is transformed, the outermost receive tension but the innermost may actually receive high compression. In particular, circumference of the innermost can be considerably shortened compared to circumference of the outermost. Hence, as mentioned in the foregoing description, if the cover 500 is made of a highly elastic material, although the innermost of the cover 500 can efficiently absorb given compression while being transformed, it can generate considerable amount of wrinkles due to a shortened circumference. The wearable smart device 10 is unable to have a good appearance due to the wrinkles.

Since the radial innermost of the transformed cover 500 is directly contacted with a body of a user, the user is unable to comfortably wear the device 10 due to the wrinkles. For this reason, the cover 500 can be made of such a material as metal or plastic of limited flexibility or elasticity to prevent wrinkles from being generated when the cover is transformed. As mentioned in the foregoing description, in order to enable restoration and transformation to be performed and secure a required structural strength, the frames 100 to 400 can also be made of a similar material.

The cover 500 may have a solid body made of the aforementioned material. Yet, as commonly shown in FIGS. 2 to 5, the cover 500 is configured to wrap all of the frames 100 to 400 and components accommodated in the frames from the sides and a bottom part to form an appearance. Hence, it may be very difficult to transform the cover 500 including the solid body. For this reason, as shown in the drawing, the cover 500 can include a plurality of link members 510. Other parts of the cover 500 except a non-transformable part 530 for accommodating non-transformable components can consist of the link member 510. The link members 510 are separated from each other with a prescribed space and are arranged in a row according to a length direction of the cover 500.

Hence, the cover 500 can be easily transformed according to the aforementioned overall configuration. In general, the link member 510 can consist of members of a channel shape. Hence, the link member can wrap a bottom part and both sides of the frames 100 to 400 and the components. When a configuration of the link member 510 is considered, it may be explained as the cover 500 includes a plurality of segments or sections configured to wrap the frames 100 to 400 and the components. The link member 510 corresponds to the segments or the sections. Hence, all of the link members 510 included in the following description may be explained as a segment or a section of the cover 500 as well.

As mentioned in the foregoing description, since the link members 510 are separated from each other, it can easily transform the cover 500. Yet, a gap (clearance) formed between the link members 510 may expose the frames 100 to 400 and the components to the external and the frames and the components may not be protected. And, an external object may be inserted into the inside of the device via the gap and the device may drive malfunction. Hence, the cover 500 can include a middle member 530, which is arranged between adjacent link members 510.

The middle member 520 can connect adjacent link members 510 with each other. In particular, the middle member 520 can wrap the frames 100 to 400 and the components using a scheme identical to the scheme of the link member 510. Hence, the middle member 520 covers the gap between the link members 510 and the cover 500 can efficiently protect the frames 100 to 400 and the components. The middle member 520 can be made of the aforementioned highly elastic material such as TPE and TPU. Hence, when the cover 500 is transformed, the middle member 520 can also be elastically transformed together with the cover 500. By doing so, the cover 500 can be easily transformed. On the contrary, if elasticity of the middle member 520 is high, the link member 510 may not be transformed when the cover 500 is transformed.

Hence, the cover 500 may include the link member 510, which is not actually transformed when the cover is transformed, and the middle member 520, which is considerably transformed when the cover is transformed. Of course, if the cover 500 is considerably transformed, the link member 510 can also be slightly transformed within an elasticity range of the link member. In particular, it may be explained as the cover 500 includes a plurality of first bodies 510, which are not transformed until the cover 500 is transformed, and a second body 520, which is also transformed when the cover 500 is transformed. The first body and the second body correspond to the link member 510 and the middle member 520, respectively. Hence, such terminologies as the link member 510 and the middle member 520 can be replaced with such terminologies as the first body and the second body, respectively, in the present specification. The first body and the second body identically share all characteristics of the link member 510 and the middle member 520, respectively.

As mentioned in the foregoing description, when the cover 500 is transformed, the outermost receives tension but the innermost may receive actual compression. In order for the innermost bound by the outermost to be smoothly transformed with big curvature under the compression, the innermost should be able to form a shorter circumference compared to the outermost when the cover 500 is transformed. In particular, the innermost should be able to form circumference, which is shortened as much as a required moving distance, to be transformed with big curvature. As mentioned in the foregoing description, the cover 500 uses link members 510 configured to be separated from each other to have a space. Hence, when the cover 500 is transformed, as shown in FIG. 5, the innermost of the link members 510 can be getting close to each other while reducing the space.

Hence, circumference formed by the innermost can be reduced to enable the innermost to sufficiently form smooth curvature without transforming the link member 510. In this instance, since the middle member 520 can be compressed between the link members 510 with sufficient elasticity, the middle member may not prevent the innermost of the link member 510 from being getting close to each other. As shown in FIG. 16, since the middle member 520 has a size capable of being arranged at a gap between the link members 510, the middle member is not considerably transformed as much as generating a wrinkle in the innermost of the cover 500. Instead, the middle member 510 can be concavely transformed toward the inside of the cover 500 by compression in the innermost without being projected to external. Hence, the innermost of the transformed cover 500 forms smooth curvature and an inner side without a projected wrinkle. By doing so, the wearable smart device 10 can be comfortably mounted on a user. And, for the same reason, an appearance of the device 10 can be enhanced since there is no projected wrinkle. Meanwhile, each of the middle members 520 can be tensioned in the outermost to form smooth curvature with the help of elasticity of the middle member 520.

Yet, as shown in FIG. 15 (a), in case of a side part of the link member 510 parallel to a length direction of the cover 500, when an upper edge and a lower edge of the side part have a shape identical to each other, if the cover 500 is transformed, a radial innermost of the transformed link member 510 may interfere with each other. Hence, preferably, the link member 510 can be additionally configured not to interfere with each other when the cover 500 is transformed. More specifically, as shown in FIG. 15 (b), the side part of the link member 510 parallel to the length direction of the cover 500 or the link member 510 may have a lower edge shorter than an upper edge. The link member 510 may have a shape of a reversed ladder. Due to the shape of the side part, the innermost of the link member 510 can be separated from each other with a bigger space. Hence, although the cover 500 is considerably transformed, the link members 510 may not interfere with each other.

Moreover, the cover 500 can be more optimized in consideration of a geometrical relation and a shape of the link member 510. In relation to design of the optimized cover, FIG. 16 shows a part of the transformed cover 500 partially magnified. Referring to both FIG. 5 and FIG. 16, 'a' indicates a length of a lower edge in the side part of the link member 510 parallel to the length direction of the cover 500 and 'b' indicates a space between lower edges in the side part of the link members 510 adjacent to each other. 'c' indicates a length of an upper edge in the side part of the link member 510 and 't' indicates thickness of the cover 500. When the cover 500 is transformed, 'r' indicates curvature radius in a radial outermost of the transformed cover 500 and 'α' indicates an angle of circumference formed by the transformed cover 500. Lastly, 'e' may indicate the number of link members 510 included in circumference of the cover 500 formed by the angle (α) of circumference.

When the cover 500 is transformed, a length (D1) of a single link member 510 formed in a radial innermost of the link member 510 including a space (b) may become 'a+b'. Hence, a length of the innermost formed by all link members 510 included in the transformed cover 500 may become the following.

$$(a \pm b)e \quad (1)$$

Meanwhile, innermost circumference (D2) of the transformed cover 500 may become the following.

$$2\pi(r-t)\frac{\alpha}{360} \quad (2)$$

The length (D1) according to the formula (1) and the circumference (D2) according to the formula (2) may be identical to each other. Hence, such a relation as formula (3) in the following can be established.

$$(a+b)e = 2\pi(r-t)\frac{\alpha}{360} \quad (3)$$

In designing the cover 500, as mentioned in the foregoing description, the lengths (a and b) of the innermost of the link member 510 are important in preventing interference between link members 510 capable of being occurred when the cover is transformed. More specifically, the length (a) is used for determining a size of a member (i.e., link member 510) not transformed by compression when the cover 500 is transformed. The length (b) can be used for designing a member (i.e., middle member 520) transformed by compression when the cover 500 is transformed. The rest of variables except the lengths (a and b) correspond to constant numbers used for designing the cover. The variables can be provided in advance. Hence, the aforementioned formula can be summarized based on 'a' and 'b' as follows.

$$a+b = \frac{\alpha\pi(r-t)}{180e} \quad (4)$$

In particular, sum of the length (a) and the length (b) can be calculated as a constant value according to the formula (4). The length (a) and the length (b) can be determined within a range of the calculated value. The cover 500 can be designed not to have interference of the link member 510 according to the aforementioned formula. Hence, when the cover 500 is transformed according to the formula, the cover 500 can be optimized to form smooth curvature.

Consequently, the cover 500 includes the link member 510, which is not transformed when the cover is transformed, and the middle member 520, which is transformed when the cover is transformed. The link member 510 and the middle member 520 can be optimally arranged and designed according to the configuration shown in the drawings and the formula. Hence, when the cover 500 is transformed, it can prevent wrinkles from being generated in the innermost of the cover. Not only the innermost but also the outermost can be transformed to have smooth curvature and a curved surface. For this reason, a user can comfortably wear the wearable smart device 10 and an appearance of the device 10 can be enhanced. For the same reason, the cover 500 can be easily transformed with curvature fitting to a user and the user can wear the device for a long time due to comfortable wearing sensation. Hence, the user can conveniently wear and use the wearable smart device 10.

Advantageous effects of the aforementioned wearable smart device are described in the following. According to an embodiment of the present invention, a second frame is movably coupled with a first frame to enable the second frame to perform relative movement for the first frame. Hence, when the wearable smart device is worn on a user, the second frame, which is adjacent to the user, can form smooth curvature and a curved surface while being deformed with a relatively big curvature. For this reason, since the first and the second frame provide structural stability by the coupling and form the smooth curvature and the curved surface via the relative movement, the user can comfortably wear the wearable smart device.

A cover includes a link member, which is not deformed when the cover is deformed, and a middle member, which is deformed together when the cover is deformed. The link member and the middle member can be optimally arranged and designed. Hence, when the wearable smart device is deformed to be worn on the user, it can prevent wrinkles from being generated in innermost of the device. Not only the innermost but also outermost can be deformed to have curvature and a curved surface. For this reason, the user can comfortably wear the wearable smart device and an appearance of the device can be enhanced as well.

Moreover, when the device is worn on the user, the first and the second frame and the cover can be deformed with curvature fitting to the user with the help of structural characteristics of the device. The user can wear the device for a long time due to comfortable wearing sensation. Hence, the user can conveniently wear and use the wearable smart device.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A wearable smart device, comprising:
   a flexible display unit;
   a first frame configured to support the flexible display unit and be recoverably deformed to have a first curvature to be worn on a body of a user; and
   a second frame configured to be recoverably deformed to have a second curvature greater than the first curvature and to be movably coupled with the first frame to relatively move with respect to the first frame while being deformed,
   wherein the second frame includes a space to accommodate components for driving the wearable smart device and is slidably coupled with the first frame.

2. The wearable smart device of claim 1, wherein the flexible display unit is configured to be recoverably deformed with the first curvature together with the first frame.

3. The wearable smart device of claim 1, wherein the first frame includes a long plate shape and a plurality of notches alternately arranged at both sides of the first frame according to a length direction of the first frame.

4. The wearable smart device of claim 1, wherein the second frame is arranged at lower part of the first frame to be closer to the user compared to the first frame.

5. The wearable smart device of claim 1, wherein the second frame relatively moves toward an outside of a length direction for the first frame while being deformed.

6. The wearable smart device of claim 1, wherein the second frame comprises a plurality of cutouts arranged according to a length direction of the second frame and a plurality of links connected with each other and configured to control an angle between the links.

7. The wearable smart device of claim 6, wherein the second frame comprises a first link containing a plurality of grooves and a second link containing a protrusion, which is connected with the first link and coupled with one of a plurality of the grooves to change an angle for the first link.

8. The wearable smart device of claim 1, further comprising:
a slot provided to one of the first and the second frame; and
a hook or a protrusion provided to the other one of the first and the second frame to be coupled with the slot and the hook or the protrusion capable of moving according to the slot.

9. The wearable smart device of claim 1, further comprising:
a cover configured wrapping the first frame and the second frame and configured to be recoverably deformed to have a prescribed curvature,
wherein the cover comprises an opening at which the flexible display is positioned and a plurality of link members separated from each other with a prescribed space.

10. The wearable smart device of claim 9, wherein the cover comprises a middle member configured to connect adjacent link members with each other, and
wherein the middle member is configured to be deformed together when the cover is deformed.

11. The wearable smart device of claim 9, wherein the link members are not deformed together when the cover is deformed.

12. The wearable smart device of claim 9, wherein the link members are configured not to interfere with each other when the cover is deformed.

13. The wearable smart device of claim 9, wherein a side part of a corresponding link member parallel to a length direction of the cover comprises a lower edge shorter than an upper edge.

14. The wearable smart device of claim 9, wherein a side part of a corresponding link member parallel to a length direction of the cover comprises a shape of a reversed ladder.

15. The wearable smart device of claim 9, wherein when
a is a length of a lower edge of a side part of the link member parallel to a length direction of the cover;
b is a space between lower edges of side parts of the link members adjacent to each other when the cover is deformed;
t is a thickness of the cover;
α is, when the cover is deformed, an angle of circumference formed by the deformed cover;
r is, when the cover is deformed, a curvature radius in a radial outermost of the deformed cover; and
e is a number of link members contained in a deformed part of the cover,
a sum of the a and the b is determined by the following formula:

$$a + b = \frac{\alpha \pi (r - t)}{180 e}.$$

16. A wearable smart device, comprising:
a flexible display unit;
a frame configured to support the flexible display unit and other components and be recoverably deformed to have a prescribed curvature to be worn on a body of a user; and
a cover wrapping the frame and configured to be recoverably deformed with a prescribed curvature together with the frame,
wherein the cover includes a plurality of first bodies, which are not deformed when the cover is deformed, and a corresponding second body, which is respectively arranged between the first bodies and deformed together when the cover is deformed.

17. The wearable smart device of claim 16, wherein the first bodies are separated from each other with a prescribed space and do not interfere with each other when the cover is deformed, and
wherein the corresponding second body is configured to connect adjacent first bodies with each other.

18. The wearable smart device of claim 16, wherein a side part of a corresponding first body parallel to a length direction of the cover comprises a lower edge shorter than an upper edge.

19. The wearable smart device of claim 16, wherein a side part of a corresponding first body parallel to a length direction of the cover comprises a shape of a reversed ladder.

20. The wearable smart device of claim 16, wherein when
a is a length of a lower edge of a side part of the first body parallel to a length direction of the cover;
b is a space between lower edges of side parts of the first bodies adjacent to each other when the cover is deformed;
t is a thickness of the cover;
α is, when the cover is deformed, an angle of circumference formed by the deformed cover;
r is, when the cover is deformed, curvature radius in a radial outermost of the deformed cover; and
e is a number of the first bodies contained in a deformed part of the cover,
a sum of the a and the b is determined by the following formula:

$$a + b = \frac{\alpha \pi (r - t)}{180 e}.$$

* * * * *